United States Patent
Asano et al.

(10) Patent No.: US 11,958,635 B2
(45) Date of Patent: Apr. 16, 2024

(54) LINEAR PROGRAMMING PROBLEM SOLVING SYSTEM, SOLUTION CANDIDATE CALCULATION DEVICE, OPTIMAL SOLUTION CALCULATION DEVICE, THRUSTER CONTROL DEVICE FOR SPACECRAFT, FLYING OBJECT CONTROL DEVICE, AND LINEAR PROGRAMMING PROBLEM SOLVING METHOD

(71) Applicant: Mitsubishi Electric Corporation, Tokyo (JP)

(72) Inventors: Yuta Asano, Tokyo (JP); Takehiro Nishiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 859 days.

(21) Appl. No.: 17/042,956

(22) PCT Filed: May 23, 2018

(86) PCT No.: PCT/JP2018/019880
§ 371 (c)(1),
(2) Date: Sep. 29, 2020

(87) PCT Pub. No.: WO2019/224954
PCT Pub. Date: Nov. 28, 2019

(65) Prior Publication Data
US 2021/0094705 A1    Apr. 1, 2021

(51) Int. Cl.
*B64G 1/24*    (2006.01)
*G06F 17/12*    (2006.01)
*G06F 17/16*    (2006.01)

(52) U.S. Cl.
CPC ............. *B64G 1/245* (2023.08); *G06F 17/12* (2013.01); *G06F 17/16* (2013.01)

(58) Field of Classification Search
CPC ......... B64G 1/245; G06F 17/00; G06F 17/11; G06F 17/12; G06F 17/16
See application file for complete search history.

(56) References Cited

U.S. PATENT DOCUMENTS

| | | | |
|---|---|---|---|
| 6,208,915 B1 | 3/2001 | Schuette et al. | |
| 8,812,421 B1 * | 8/2014 | Ledbetter, Jr. | G06Q 10/04 706/46 |

(Continued)

FOREIGN PATENT DOCUMENTS

| | | | |
|---|---|---|---|
| JP | 2000-142596 A | 5/2000 | |
| JP | 2001-184334 A | 7/2001 | |

(Continued)

OTHER PUBLICATIONS

T. Nishiyama at al., Optimal Torque Assignment for Redundant Wheels, IAC-05-C1.3.08, 2012 (Year: 2012).*
European Office Action dated Nov. 17, 2022, issued for the corresponding EP patent application No. 18919813.8, 4 pp.

(Continued)

*Primary Examiner* — Emily E Larocque
(74) *Attorney, Agent, or Firm* — XSENSUS LLP

(57) ABSTRACT

A dual solution candidate searcher receives an input of information about a constraint coefficient matrix and a cost vector, determines a dual problem of a linear programming problem being a primal problem and all active sets representing combinations of active formulas in constraints of the dual problem, finds, for each of the active sets, a feasible dual solution candidate meeting constraints, and stores the dual solution candidate into a storage in a manner associated with a corresponding one of the active sets. An optimal solution calculation device receives an input of a constraint vector as, selects an optimal one of the active sets as an optimal active set based on an inner product of the constraint vector and the dual solution candidate stored in the storage, (Continued)

and finds and outputs a basic feasible solution corresponding to the selected active set as an optimal solution.

6 Claims, 13 Drawing Sheets

(56) References Cited

U.S. PATENT DOCUMENTS

2015/0331833 A1* 11/2015 Lustig .................... G06F 17/11
                                                                          708/274
2019/0147013 A1* 5/2019 Zhuang .............. H04N 23/6812
                                                                          708/201

FOREIGN PATENT DOCUMENTS

| JP | 2002-505632 A | 2/2002 |
| JP | 2005-250992 A | 9/2005 |

OTHER PUBLICATIONS

International Search Report and Written Opinion dated Aug. 21, 2018 for PCT/JP2018/019880 May 23, 2018, 8 pages including English Translation of the International Search Report.
Extended European Search Report dated May 21, 2021 in European Patent Application No. 18919813.8, 9 pages.
Min Wang, et al., "Design of the Optimal Thruster Combinations Table for the Real Time Control Allocation of Spacecraft Thrusters", Joint 48th IEEE Conference on Decision and Control and 28th Chinese Control Conference, Dec. 16-18, 2009, XP031620400, 6 pages.

* cited by examiner

LINEAR PROGRAMMING PROBLEM SOLVING SYSTEM, SOLUTION CANDIDATE CALCULATION DEVICE, OPTIMAL SOLUTION CALCULATION DEVICE, THRUSTER CONTROL DEVICE FOR SPACECRAFT, FLYING OBJECT CONTROL DEVICE, AND LINEAR PROGRAMMING PROBLEM SOLVING METHOD

CROSS-REFERENCE TO RELATED APPLICATION

The present application is based on PCT filing PCT/JP2018/019880, filed May 23, 2018, the entire contents of which are incorporated herein by reference.

TECHNICAL FIELD

The present disclosure relates to a linear programming problem solving system for receiving an input vector and calculating an output vector that minimizes a linear evaluation function within linear constraints, and a control device including the system.

BACKGROUND ART

Typical methods for solving linear programming problems include interior point methods and simplex methods. Interior point methods include iterative calculation with a heavy load and have difficulty in estimating the time to converge. Simplex methods allow calculation to end after a finite number of iterations, but have difficulty in estimating the time to converge.

Patent Literature 1 describes a technique for solving a linear programming problem having upper and lower bounds. More specifically, the variable is replaced with the difference between the variable and the upper bound of the domain of the variable to reverse the upper and lower bounds, and the calculation is continued by avoiding the limitation of interior point methods.

The methods for solving linear programming problems may be directed to controlling a plurality of actuators. For example, such methods may be used for controlling spacecraft thrusters with the posture of the spacecraft controlled by thruster injection, or a drone incapable of outputting a rotor thrust in more than one direction. The injection quantity of spacecraft thrusters does not have negative values, and minimizing the injection fuel is thus a linear programming problem. In controlling a drone rotor, the posture can be changed quickly with a higher priority assigned to the torque than the thrust. The problem of achieving the nearest possible target torque within the upper and lower bounds of the rotor rotational speed is a linear programming problem.

Patent Literature 2 describes a simplex method for solving a linear programming problem of finding a minimum-fuel drive vector at high speed for thruster driving based on data precalculated and stored. When the method cannot yield the optimal solution within a control loop, a solution is output apart from the optimality or the constraints, or thruster driving is not performed.

CITATION LIST

Patent Literature

Patent Literature 1: Unexamined Japanese Patent Application Publication No. 2001-184334

Patent Literature 2: Unexamined Japanese Patent Application Publication (Translation of PCT Application) No. 2002-505632

SUMMARY OF INVENTION

Technical Problem

Known linear programming problem solving systems use interior point methods and simplex methods with iterations. Such methods have difficulty in estimating the time taken to find the optimal solution and may fail to find the optimal solution within a control cycle. Any failure to find the optimal solution within a control cycle may compromise the optimality or violate the constraints.

Solution to Problem

A linear programming problem solving system according to an aspect of the present disclosure is a system for finding a solution to a linear programming problem of optimizing an objective function of a variable vector and a cost vector under constraints represented by simultaneous formulas having a given constraint coefficient matrix, a periodically varying constraint vector, and the variable vector including a variable having a variable dimensionality different from a constraint dimensionality of the constraint vector. The system includes a dual solution candidate searcher that receives an input of information about the constraint coefficient matrix and the cost vector, determines a dual problem of the linear programming problem being a primal problem and all active sets representing combinations of active formulas in constraints of the dual problem, finds, for each of the active sets, a feasible dual solution candidate meeting the constraints, and stores the dual solution candidate into a storage in a manner associated with a corresponding one of the active sets, and an optimal solution calculation device that receives an input of the constraint vector, selects an optimal one of the active sets as an optimal active set based on an inner product of the constraint vector and the dual solution candidate stored in the storage, and finds and outputs a basic feasible solution corresponding to the selected active set as an optimal solution.

Advantageous Effects of Invention

The present disclosure reliably finds the solution to a linear programming problem within a predetermined time without compromising the optimality or violating the constraints.

DESCRIPTION OF EMBODIMENTS

Figure 1:
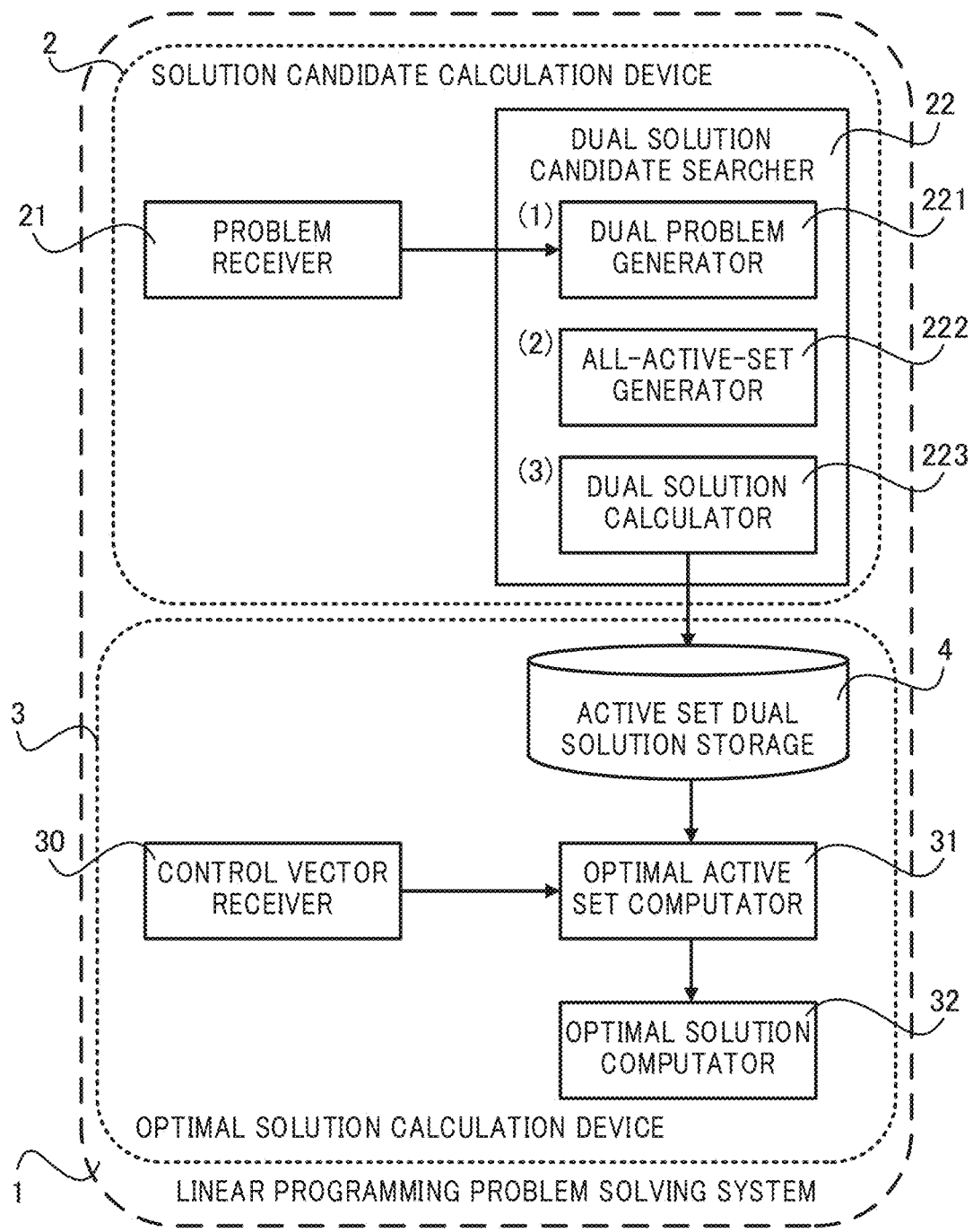
FIG. 1 is a schematic block diagram of a linear programming problem solving system according to Embodiment 1 of the present disclosure.

FIG. 1 shows the configuration of a linear programming problem solving system according to Embodiment 1 of the present disclosure. A linear programming problem solving system 1 receives an input to calculate an output vector that minimizes or maximizes a linear evaluation function within linear constraints. When repeatedly solving a target linear programming problem, the linear programming problem solving system 1 in the figure receives an input of unchangeable information and periodically varying changeable information, and finds and outputs the optimal solution to the received linear programming problem. The linear programming problem solving system 1 includes a solution candidate calculation device 2 and an optimal solution calculation device 3.

The linear programming problem solving system 1 finds the solution to a linear programming problem that optimizes an objective function of a variable vector and a cost vector under constraints represented by simultaneous formulas having a given constraint coefficient matrix, a periodically varying constraint vector, and the variable vector including a variable having a variable dimensionality different from the constraint dimensionality of the constraint vector.

The linear programming problem solving system 1 includes a dual solution candidate searcher and an optimal solution calculation device. The dual solution candidate searcher receives an input of information about the constraint coefficient matrix and the cost vector, determines the dual problem of the linear programming problem being a primal problem and all active sets representing combinations of active formulas in constraints of the dual problem, finds, for each determined active set, a feasible dual solution candidate meeting the constraints, and stores the dual solution candidate into a storage in a manner associated with a corresponding one of the active sets. The optimal solution calculation device receives an input of the constraint vector, selects the optimal active set from the active sets based on the inner product of the constraint vector and the dual solution candidate stored in the storage, and finds and outputs a basic feasible solution corresponding to the selected active set as an optimal solution.

The dual solution candidate searcher also determines the dual problem as a problem including dual constraints having formulas equal in number to the variable dimensionality. The optimal solution calculation device includes an optimal solution computator that finds the optimal solution to the variable vector based on the product of the constraint vector and the inverse of a matrix found from the constraint coefficient matrix using information about the optimal active set. An active set is expressed as formula identifiers indicating, among the formulas in the dual constraints, a combination of active formulas equal in number to the smaller one of the variable dimensionality and the constraint dimensionality. The dual solution candidate is a solution vector satisfying the formulas in the dual constraints indicated by the identifiers in the corresponding active set.

The solution candidate calculation device 2 receives an input of unchangeable information for a target linear programming problem, determines the target linear programming problem based on the received information, determines the dual problem of the obtained linear programming problem being a primal problem, finds all feasible solution candidates meeting some inequality constraints in the determined dual problem and all active sets associated with the solution candidates, and stores the solution candidates and the active sets into the storage. The number of inequality constraints to be active is the smaller one of the number of constraints in the primal problem and the number of dimensions of the variable vector.

The optimal solution calculation device 3 receives an input of periodically varying changeable information, selects the optimal active set based on the inner product of the input and each solution candidate found in the solution candidate calculation device 2, and finds and outputs the basic feasible solution corresponding to the active set as an optimal solution.

The solution candidate calculation device 2 includes a problem receiver 21 and a dual solution candidate searcher 22. The problem receiver 21 receives the unchangeable information. The dual solution candidate searcher 22 determines the dual problem of the linear programming problem based on the information received by the problem receiver 21, finds, among the active sets corresponding to combinations of active dual constraints in the determined dual problem, all active sets allowing the solutions to be uniquely found, finds, for each found active set, all solutions satisfying the dual constraints as a dual solution candidate, and stores the dual solution candidate into the storage in a manner associated with the active set. The solution candidate calculation device 2 calculates information to be stored in an active set dual solution storage 4.

The dual solution candidate searcher 22 includes a dual problem generator 221, an all-active-set generator 222, and a dual solution calculator 223. The dual problem generator 221 determines the dual problem of the linear programming problem based on the received information. The all-active-set generator 222 finds, among the active sets corresponding to combinations of active dual constraints in the determined dual problem, all active sets allowing the solutions to be uniquely found. The dual solution calculator 223 finds, for each active set, all solutions satisfying the dual constraints as a dual solution candidate, and stores the dual solution candidate into the storage in a manner associated with the active set.

The optimal solution calculation device 3 includes an active set dual solution storage 4, a control vector receiver 30, an optimal active set computator 31, and an optimal solution computator 32. The control vector receiver 30 receives changeable information varying at any time for the linear programming problem. The optimal active set computator 31 finds, based on the changeable information received by the control vector receiver 30, the optimal active set that is an active set optimal for the dual problem from the dual solution candidates found by the dual solution candidate searcher 22 and stored in the storage. The optimal solution computator 32 finds and outputs the optimal solution to the linear programming problem based on the found optimal active set, the unchangeable information, and the changeable information.

A non-degenerate standard linear programming problem will now be described as an example linear programming problem optimized by the linear programming problem solving system 1. The linear programming problem discussed below optimizes (minimizes) an objective function of a variable vector x under constraints represented by simultaneous equations having a given constraint coefficient matrix A, a periodically varying constraint vector b, and the nonnegative variable vector x including a variable having a variable dimensionality N greater than a constraint dimensionality M, which is the number of dimensions of the constraint vector b. The problem is represented by formulas (1) to (3) below as a standard linear programming problem.

Formula 1
$$\min_x c^T x \qquad (1)$$

Formula 2
$$\text{s.t. } Ax = b \qquad (2)$$

Formula 3
$$x \geq 0 \qquad (3)$$

The cost vector c is an N-dimensional (column) vector having the variable dimensionality N, the constraint coefficient matrix A is an M (constraint dimensionality)×N (variable dimensionality) matrix, and the constraint vector b is an M-dimensional (column) vector having the constraint dimensionality M. The variable vector x is an N-dimensional (column) vector having the variable dimensionality N, and the variable dimensionality N is greater than the constraint dimensionality M. T denotes a transposed matrix. All the vectors are column vectors, and the transposed matrix $c^T$ of the cost vector c is a row vector. In formula (2), s.t. denotes "such that," meaning that constraints that follow are satisfied.

Formula (2) shows that the product of the constraint coefficient matrix A and the variable vector x is the constraint vector b. Formula (3) shows that all the elements of the variable vector x are zero or more.

Formula (1) represents finding one of the variable vectors x satisfying formulas (2) and (3) and minimizing the inner product of the cost vector c and the variable vector x.

For a typical linear programming problem, the above constraint coefficient matrix A is given, and the variable dimensionality N of the variable vector x is greater than the constraint dimensionality M of the periodically varying constraint vector b. Under the constraints that the product of the constraint coefficient matrix A and the variable vector x is the constraint vector b, and the variable vector x is nonnegative, the problem is directed to minimizing the inner product of the variable vector x and the cost vector c having elements that are any given real numbers. The constraint coefficient matrix A and the cost vector c are unchangeable.

The above problem may be applied to, for example, optimizing the control variables for actuators to be controlled. In this case, the constraint coefficient matrix A is a transformation matrix depending on the geometrical arrangement of the actuators. The variable vector x includes the control variables for the actuators. The cost vector c is a weight on the variable vector x. The problem is characterized as described below. The control coefficient matrix A that is the transformation matrix and the cost vector c that is the weight on the variable vector x, or the control variables, are provided as unchangeable information. In accordance with the control vector b serving as target values of periodically varying force and torque, the problem is directed to optimizing the variable vector x including the control variables greater in number than the parameters of the target values of the force and the torque.

For spacecraft thrusters to be controlled, the constraint coefficient matrix A is a matrix depending merely on the geometrical arrangement of the thrusters, the cost vector c is a vector with every element being 1, the constraint vector b is a vector with target translation force and torque values arranged, and the variable vector x indicates the injection quantity of each thruster. For control of three translational degrees of freedom and three rotational degrees of freedom, the constraint dimensionality M is 6, and the variable dimensionality N represents the number of thrusters.

Any linear programming problem can be transformed into a standard linear programming problem represented as formulas (1) to (3), and thus a linear programming problem in another form may be transformed into the above linear programming problem in the standard form for optimization. Any degenerate problem can be perturbed and translated into a non-degenerate problem, and thus the linear programming problem may be a degenerate problem (the definitions of degenerate and non-degenerate will be described later in the dual problem section). The problem discussed below is a standard linear programming problem represented as formulas (1) to (3), with the constraint coefficient matrix A and the cost vector c being unchangeable, and the constraint vector b varying over time. A method for solving the problem repeatedly at high speed will be described in detail.

The problem receiver 21 receives the constraint coefficient matrix A and the cost vector c. More specifically, for example, the constraint coefficient matrix A and the cost vector c may be input by the user through a tabular user interface. In other cases, the problem receiver 21 may receive a file containing information about each element of the constraint coefficient matrix A and the cost vector c.

The dual problem generator 221 generates a linear programming problem based on the constraint coefficient matrix A and the cost vector c received by the problem receiver 21, and generates the dual problem of the linear programming problem being a primal problem.

The dual problem generated by the dual problem generator 221 is information including dual constraints having inequalities equal in number to the greater one of the variable dimensionality N and the constraint dimensionality M. For example, when the non-degenerate standard linear programming problem represented by formulas (1) to (3) is a primal problem, the dual problem can be represented as described below.

Formula 4

$$\max_{y} b^T y \quad (4)$$

Formula 5

$$\text{s.t.} \quad A^T y \le c \quad (5)$$

Inequality constraint formula (5) shows that the product of the transposed matrix of the constraint coefficient matrix A and a solution vector y of the dual problem is equal to or smaller than the cost vector c. Formula (4) represents finding the solution vector y that satisfies inequality constraint formula (5) and maximizes the inner product of the constraint vector b and the solution vector y.

In the above dual problem, inequality constraint formula (5) can be solved beforehand, because the constraint coefficient matrix A and the cost vector c are fixed as described above.

The feasible region that is the region of the solution vector y satisfying inequality constraint formula (5) is a convex polyhedron within the space of M-dimensional real numbers. In accordance with common characteristics of linear programming problems, one vertex of the feasible region of the solution vector y satisfying inequality constraint formula (5) is to be the optimal solution. Each vertex is referred to as a basic feasible solution.

Figure 12:
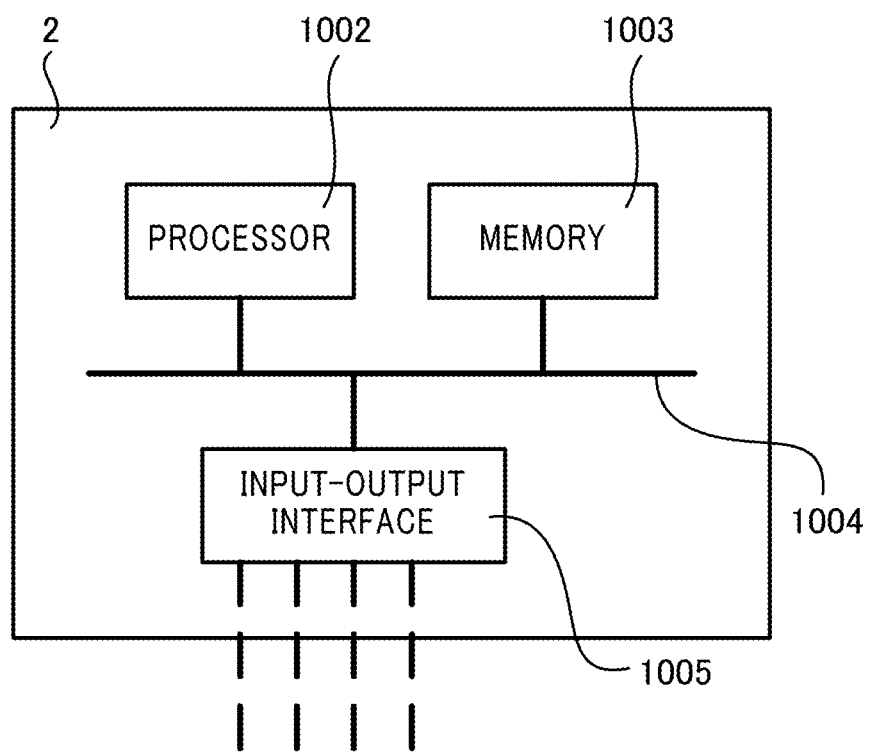
FIG. 12 is a hardware block diagram of the solution candidate calculation device according to the embodiments of the present disclosure.

FIG. 12 is an example hardware block diagram of the solution candidate calculation device 2 according to the present embodiment. In the figure, an input-output interface 1005 allows input into the problem receiver 21 and display for the user interface, as well as output of found active sets, dual solution candidates, and the relationship between the active sets and the dual solution candidates to the optimal solution calculation device 3 or to an external storage device. A processor 1002 performs the operations of the dual solution candidate searcher 22 for finding the dual problem of a linear programming problem, active sets, and dual solution candidates. A memory 1003 contains programs to be executed in the solution candidate calculation device 2 and stores the dual solution candidates and the active sets found in the dual solution candidate searcher 22, in a manner associated with each other, to serve as the active set dual solution storage 4. A bus 1004 transmits information and signals among the processor 1002, the memory 1003, and the input-output interface 1005. The active set dual solution storage 4 may be the memory 1003 for the solution candidate calculation device 2, an external storage device, or a memory for the optimal solution calculation device 3.

Figure 13:
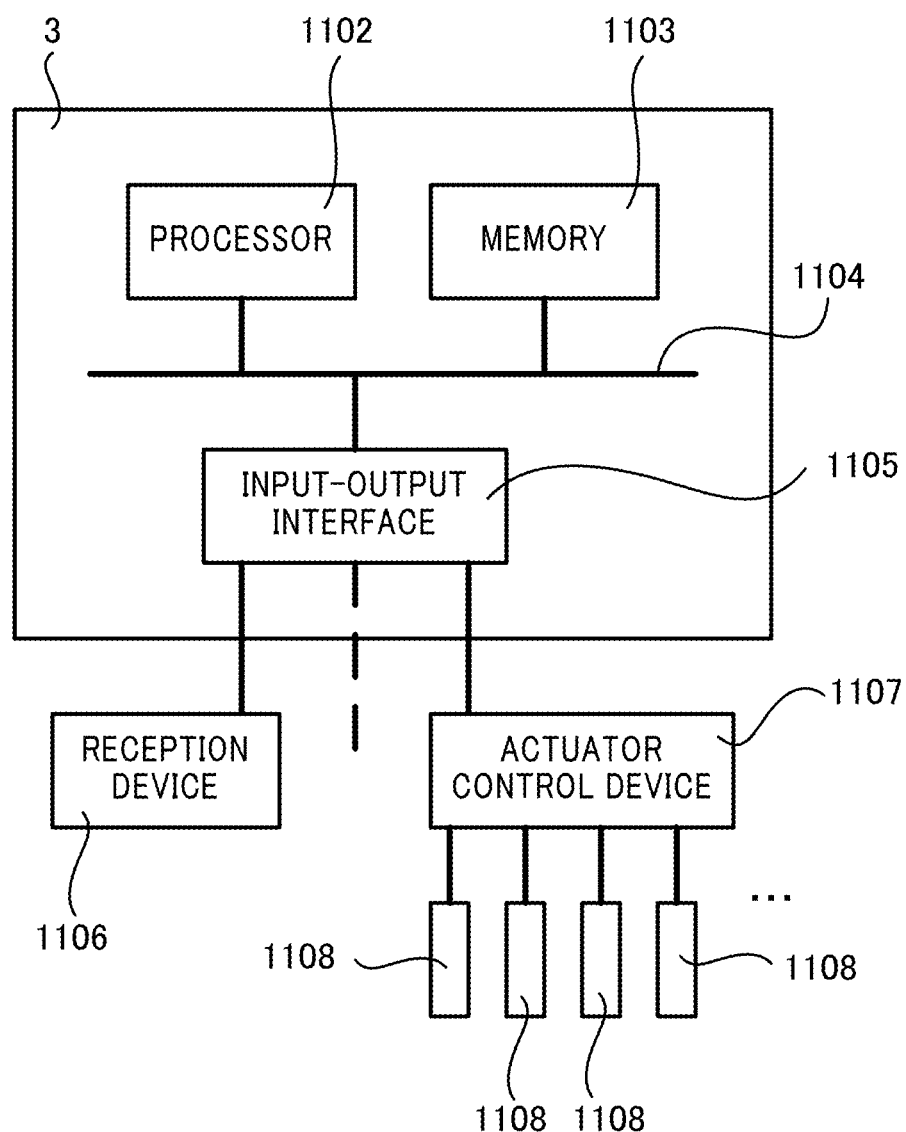
FIG. 13 is a hardware block diagram of the optimal solution calculation device according to the embodiments of the present disclosure.

FIG. 13 is an example hardware block diagram of the optimal solution calculation device 3 according to the present embodiment. In the figure, an input-output interface 1105 allows input into the control vector receiver 30 that receives periodically varying changeable information for a linear programming problem and input of a dual solution candidate associated with an active set found in the dual solution candidate searcher 22. A processor 1102 performs the operations of the optimal active set computator 31 for finding an optimal active set and operations of the optimal solution computator 32 for finding an optimal solution. A memory 1103 contains programs to be executed in the optimal solution calculation device 3 and stores the dual solution candidate associated with the active set found in the dual solution candidate searcher 22. A bus 1104 transmits information and signals among the processor 1102, the memory 1103, and the input-output interface 1105. The active set dual solution storage 4 may be the memory 1103 for the optimal solution calculation device 3, an external storage device, or the memory 1003 for the solution candidate calculation device 2.

The memories 1003 and 1103 may be, for example, nonvolatile or volatile semiconductor memories such as a random-access memory (RAM), a read-only memory (ROM), a flash memory, an erasable programmable ROM (EPROM), an electrically EPROM (EEPROM), and disks such as a magnetic disk, a flexible disk, an optical disc, a compact disc, a minidisc, and a digital versatile disc (DVD).

FIG. 13 also shows an example overview of equipment including the optimal solution calculation device 3 that optimizes control variables for actuators to be controlled as described above as an example. In the figure, the input-output interface 1105 is connected to a reception device 1106 that receives the control vector b corresponding to target values such as periodically varying force and torque. The input-output interface 1105 is also connected to an actuator control device 1107 that controls actuators 1108 in accordance with the optimized variable vector x, or actuator control variables, found in the optimal solution calculation device 3.

The solution candidate calculation device 2 calculates all basic feasible solutions of the dual problem as optimal solution candidates. The basic feasible solution that is the optimal solution is found through the procedure described below.

Figure 2:
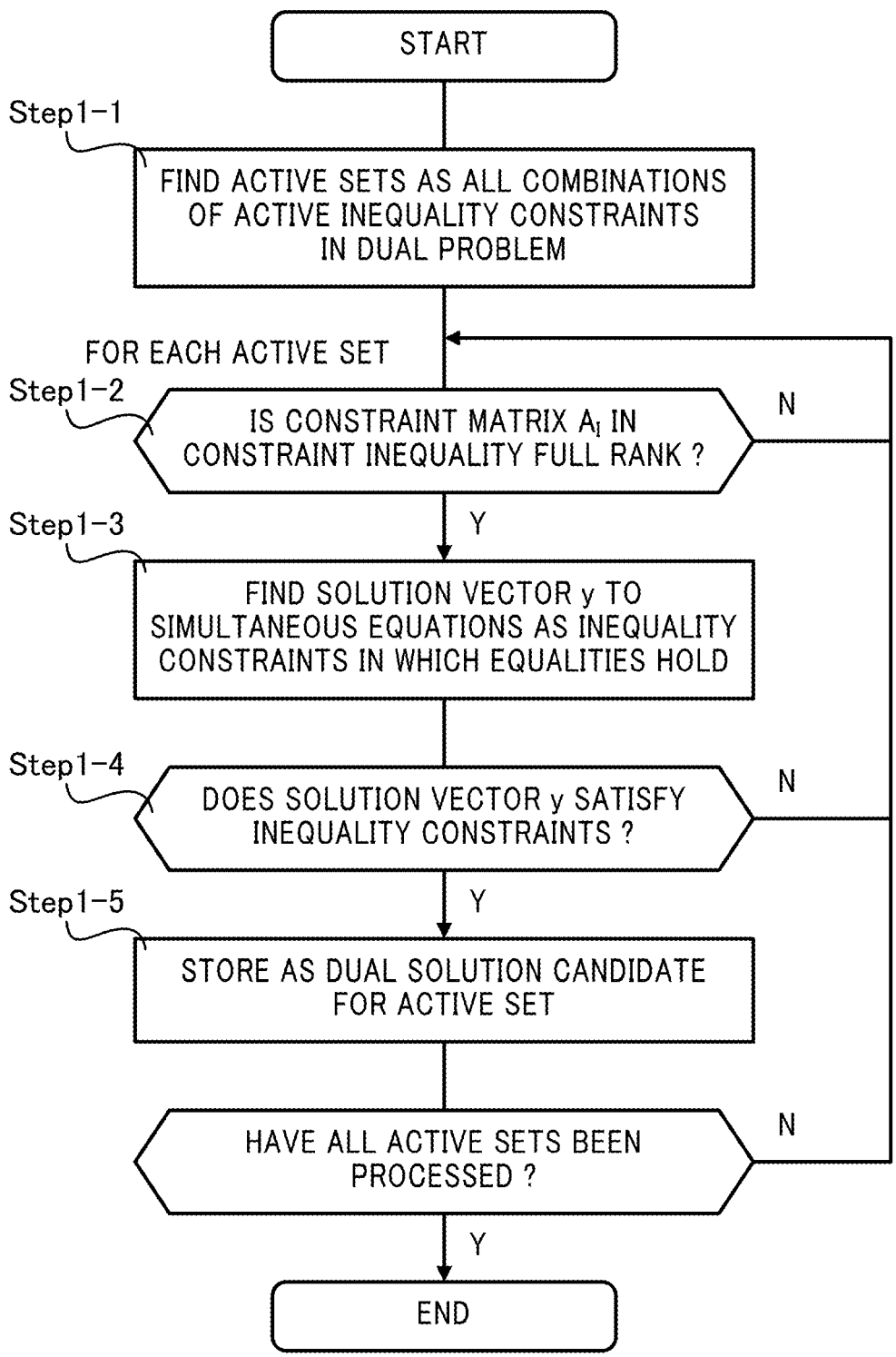
FIG. 2 is a schematic diagram of a solution candidate calculation device according to Embodiment 1 of the present disclosure.

FIG. 2 is a flowchart of the procedure performed by the solution candidate calculation device 2.

In Step 1, the solution candidate calculation device 2 generates a dual problem. The constraint coefficient matrix A is an M×N matrix, where M is the constraint dimensionality, and N is the variable dimensionality. Thus, the dual problem has inequality constraints including N (variable dimensionality) inequalities. The step is performed by the dual problem generator 221.

In Step 1-1, the solution candidate calculation device 2 determines, among N (variable dimensionality) inequality constraints, M (constraint dimensionality) constraints as active, or determines that the equalities of the constraints hold, and defines combinations of active constraints as active sets I. The active sets I correspond to the combinations of the active constraints among the N (variable dimensionality) inequality constraints. An active inequality constraint herein indicates that the equality holds, or more specifically, the constraint is an equality. For example, for the variable dimensionality N=4, when the first and the third inequality constraints are active, an active set I {1, 3} is provided.

In Step 1-2, the solution candidate calculation device 2 defines M (constraint dimensionality)-dimensional vectors in the i-th column of the constraint coefficient matrix A as i-th column constraint coefficient vectors $a_i$, and determines an M (constraint dimensionality)×M matrix in which i-th column constraint coefficient vectors $a_k (k \in I)$ are arranged horizontally in ascending order of k, as a base matrix $A_I$. Additionally, the solution candidate calculation device 2 determines whether the base matrix $A_I$ has a rank of the constraint dimensionality M, or full rank. For full rank, the solution candidate calculation device 2 proceeds to Step 1-3. For the rank that is not full rank, the solution candidate calculation device 2 returns to Step 1-2 without storing the active set, and processes the next active set.

In Step 1-3, the solution candidate calculation device 2 calculates solutions to the simultaneous equations for y in formula (6) below as dual basic solutions $y^b{}_I$.

Formula 6

$$A_I^T y = c_I \quad (6)$$

The basic cost vector $c_I$ is an M (constraint dimensionality)-dimensional vector with the k-th elements (k∈I) of the cost vector c arranged in ascending order of k. The transposed matrix of the base matrix $A_I$ is defined as a transposed base matrix $A_I^T$. More specifically, the dual basic solutions $y^b{}_I$ are found by, for example, Gaussian elimination.

In Step 1-4, the solution candidate calculation device 2 determines whether the dual basic solutions $y^b{}_I$ found in Step 1-3 satisfy inequality constraint formula (5). For inequality constraint formula (5) being satisfied, the solution candidate calculation device 2 proceeds to Step 1-5. For inequality constraint formula (5) being unsatisfied, the solution candidate calculation device 2 returns to Step 1-2 and processes the next active set.

In Step 1-5, the solution candidate calculation device 2 stores the dual basic solutions $y^b{}_I$ associated with the active set I into the active set dual solution storage 4 as a dual solution candidate $y_I$. More specifically, the active set I and the dual solution candidate $y_I$ found in Step 1-3 are associated with each other and stored into the active set dual solution storage 4. The solution candidate calculation device 2 then returns to Step 1-2 and processes the next active set I.

For different active sets I, or in other words, when the equalities of M (constraint dimensionality) constraints hold in different inequalities, the dual basic solutions $y^b{}_I$ may be the same. Such a basic solution is referred to as being degenerate. When a dual solution candidate $y_I$ has at least one degenerate basic solution, the linear programming problem is referred to as being degenerate. For a linear programming problem being non-degenerate, an active set I and a dual solution candidate $y_I$ have one-to-one correspondence.

Figure 3:
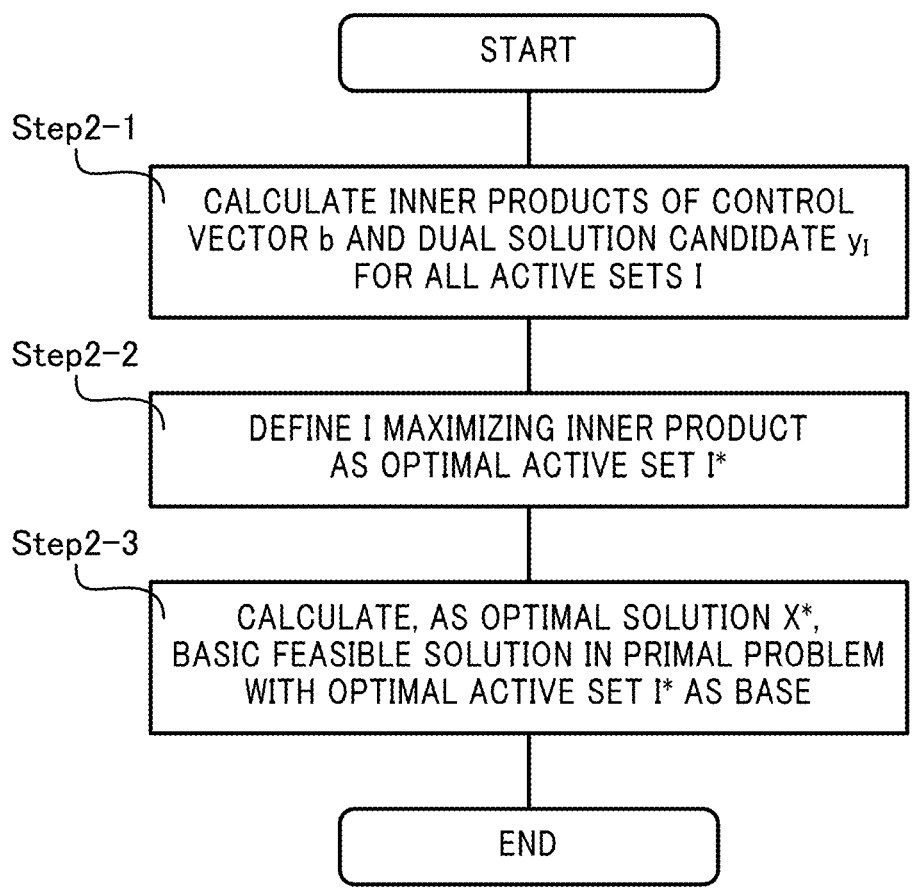
FIG. 3 is a schematic diagram of an optimal solution calculation device according to Embodiment 1 of the present disclosure.

The optimal solution calculation device 3 will now be described in detail. The optimal solution calculation device 3 receives a varying constraint vector b repeatedly over time and calculates the optimal solution x* in accordance with the constraint vector b at high speed. FIG. 3 is a flowchart for the optimal solution calculation device 3.

In Step 2-1, the optimal solution calculation device 3 calculates the inner product of the constraint vector b and the dual solution candidate $y_I$ for every active set I stored in the active set dual solution storage 4.

In Step 2-2, the optimal solution calculation device 3 defines an active set I that maximizes the inner product calculated in Step 2-1 as an optimal active set I*, and finds the optimal active set I* in accordance with formula (7) below.

Formula 7

$$I^* = \underset{I}{\arg\max}\, b^T y_I \quad (7)$$

For a plurality of optimal active sets I* that satisfy formula (7), each set provides the same optimal solution to the primal problem, and thus any one set may be selected.

In Step 2-3, the optimal solution calculation device 3 finds, as the optimal solution x*, a basic feasible solution for formula (2) in the standard linear programming problem with the optimal active set I* as a base. The basic feasible solution is calculated by solving the linear simultaneous equations below.

Formula 8

$$A_{I^*} x_{I^*} = b \quad (8)$$

Formula (8) represents simultaneous equations derived from constraint formula (2) in the primal problem, indicating that, for the optimal active set I*, the product of the M (constraint dimensionality)×M constraint coefficient matrix A and the optimal solution x* that is an M (constraint dimensionality)-dimensional column vector is equal to the constraint vector b. The optimal solution x* is found by solving the simultaneous equations of formula (8), for example, by Gaussian elimination.

In this manner, the optimal solution x* is calculated for the constraint vector b in the primal problem.

The linear programming problem solving system according to the present embodiment determines the dual problem of a given linear programming problem being a primal problem, uses the unchangeability of dual problem constraints over time to offline-calculate an optimal solution candidate in the dual problem for each active set I corresponding to a combination of active constraints, and stores the active set and the associated optimal solution candidate into the active set dual solution storage. Thus, the system calculates the optimal active set I*, or the best active set, and the associated basic solution as the optimal solution x* at high speed.

The linear programming problem solving system according to the present embodiment solves a non-degenerate standard linear programming problem in which the constraint coefficient matrix A and the cost vector c are fixed, and the constraint vector b varies. The system includes the solution candidate calculation device 2 that searches for and stores dual solution candidates $y_I$ independent of the constraint vector b and the active sets I associated with the dual solution candidates into the active set dual solution storage 4, and the optimal solution calculation device 3 that calculates the inner products of the constraint vector b and the dual solution candidates $y_I$ stored in the active set dual solution storage 4 and finds, as the optimal solution x*, the basic feasible solution to the primal problem with the maximum-inner-product active set I* as a base. These components enable dual solution candidates $y_I$ to be precalculated offline and eliminate iterative calculation during the process from when the time-varying constraint vector b is received to when the optimal solution x* to the primal problem is calculated. This increases the computing speed and reliability. In addition, estimating the time taken to calculate the optimal solution enables the optimal solution to be found reliably within the control cycle, allowing real-time control without compromising the optimality and the constraints.

Embodiment 2

A linear programming problem solving system 1 according to Embodiment 2 includes a solution candidate calculation device 2, an optimal solution calculation device 3, and an active set dual solution storage 4 as in Embodiment 1. In the solution candidate calculation device, additional information is stored in the active set dual solution storage 4 to solve the problem at higher speed. More specifically, in Embodiment 2, Step 1-5 shown in FIG. 2 for the solution candidate calculation device 2 and Step 2-3 for the optimal solution calculation device 3 are modified in the manner described below as shown in FIG. 4.

Figure 4:
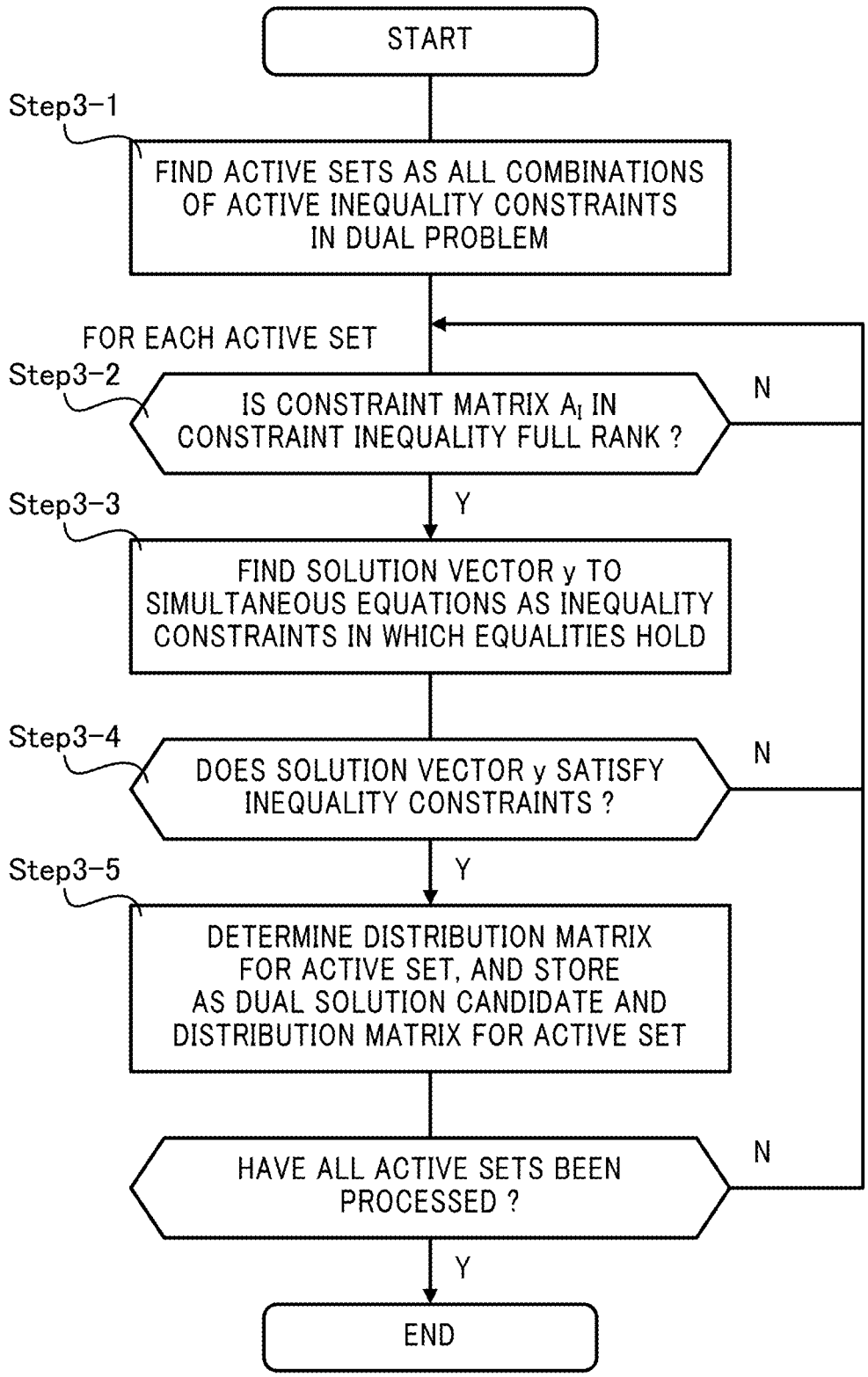
FIG. 4 is a schematic diagram of a solution candidate calculation device according to Embodiment 2 of the present disclosure.

FIG. 4 is a flowchart of the procedure performed by the solution candidate calculation device 2. In Step 3-5 in the figure, the solution candidate calculation device 2 stores the dual basic solutions $y^b{}_I$ associated with the active set I into the active set dual solution storage 4 as a dual solution candidate $y_I$ (as in Step 1-5 in Embodiment 1). Additionally, the solution candidate calculation device 2 calculates the distribution matrix $A_I^{-1}$ that is the inverse of the M (constraint dimensionality)×M constraint coefficient matrix A for each active set I, and stores the distribution matrix $A_I^{-1}$ into the active set dual solution storage 4 in a manner associated with the active set I. The distribution matrix $A_I^{-1}$, which is the inverse of the M (constraint dimensionality)×M constraint coefficient matrix A for the active set I, may be found by, for example, LU decomposition of the constraint coefficient matrix A. The solution candidate calculation device 2 then returns to Step 3-2 and processes the next active set.

Unlike the process in Embodiment 1 that ends after the search for dual solution candidates $y_I$, the distribution matrix $A_I^{-1}$ is precalculated for each optimal solution (active set) to the primal problem. Regarding the optimal solution calculation device 3 in Embodiment 1, Step 2-3 for the optimal solution calculation device 3 is modified in the manner described below as shown in FIG. 5.

Figure 5:
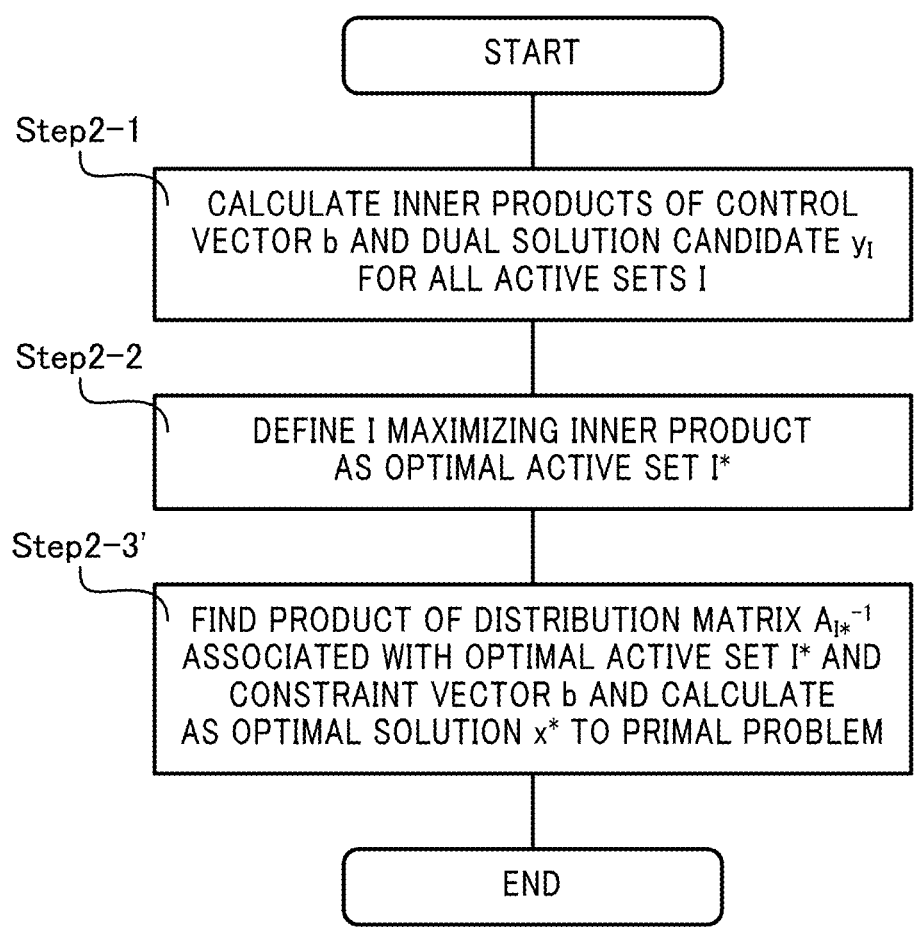
FIG. 5 is a schematic diagram of an optimal solution calculation device according to Embodiment 2 of the present disclosure.

FIG. 5 is a flowchart of the procedure performed by the optimal solution calculation device 3. In Step 2-3' in the figure, the optimal solution calculation device 3 reads the distribution matrix $A_I^{-1}$ associated with the optimal active set I* stored in the active set dual solution storage 4 as the distribution matrix $A_{I^*}^{-1}$ for the optimal active set, and finds the product $A_{I^*}^{-1}b$ of the constraint vector b and the M (constraint dimensionality)×M distribution matrix for the optimal active set to calculate the optimal solution $x_{I^*}$. In Step 2-3', the use of the already found distribution matrix $A_{I^*}^{-1}$ eliminates the calculation of the inverse matrix, further reducing the amount of computation of the optimal solution calculation device 3.

The solution candidate calculation device 2 may have the same hardware configuration including the processor 1002, the memory 1003, and the input-output interface 1005 as in FIG. 12 described in Embodiment 1. The processor 1002 calculates the distribution matrix $A_I^{-1}$, which is the inverse of the constraint coefficient matrix A. The memory 1003 stores each distribution matrix $A_I^{-1}$ into the active set dual solution storage 4 in a manner associated with the corresponding active set I.

The optimal solution calculation device 3 may also have the same hardware configuration including the processor 1102, the memory 1103, and the input-output interface 1105 as in FIG. 13 described in Embodiment 1. The memory 1103 stores each distribution matrix $A_I^{-1}$ into the active set dual solution storage 4 in a manner associated with the corresponding active set I. The processor 1102 reads the distribution matrix $A_I^{-1}$ associated with the optimal active set I* and finds the product $A_I^{-1}b$ of the distribution matrix and the constraint vector b to calculate the optimal solution $x_{I^*}$.

In the linear programming problem solving system 1 according to the present embodiment, the solution candidate calculation device 2 calculates and stores the distribution matrix $A_I^{-1}$, or the inverse of the M (constraint dimensionality)×M constraint coefficient matrix A for each active set I, into the active set dual solution storage 4 in a manner associated with the active set I, and the optimal solution calculation device 3 reads the distribution matrix $A_I^{-1}$ associated with the optimal active set I* stored in the active set dual solution storage 4 to calculate the optimal solution $x_{I^*}$. This process further reduces the amount of computation of the optimal solution calculation device 3.

The control cycle thus becomes shorter to achieve control with quick or smooth responses.

Embodiment 3

In the above embodiments, the constraint coefficient matrix A and the cost vector c are unchanged fixed values. However, the constraint coefficient matrix A and the cost vector c may vary, or change over time. In this case, the dual solution candidate $y_I$ and the distribution matrix $A_I^{-1}$ for each active set I stored in the active set dual solution storage 4 are not constants but are functions. A specific example will now be described. The constraint coefficient matrix A and the cost vector c are represented by the equations below. For simplicity, the cost vector c in this case is unchanged, and the constraint coefficient matrix A varies.

Formula 9

$$A = \begin{bmatrix} u & u & u & u & -u & -u & -u & -u \\ -v & -v & v & v & -v & -v & v & v \\ -w & w & w & -w & -w & w & w & -w \\ vz-wy & -vz+wy & vz-wy & -vz+wy & vz-wy & -vz+wy & vz-wy & -vz+wy \\ uz+wx & -uz-wx & -uz-wx & uz+wx & -uz+wx & uz-wx & uz-wx & -uz+wx \\ -uy-vx & -uy-vx & uy+vx & uy+vx & uy-vx & uy-vx & -uy+vx & -uy+vx \end{bmatrix} \quad (9)$$

Formula 10

$$c = [1 \; 1 \; 1 \; 1 \; 1 \; 1 \; 1 \; 1]^T \quad (10)$$

The constraint dimensionality M is 6, and the variable dimensionality N is 8. For example, spacecraft thrusters to be controlled are expressed using u, v, and w representing directions of thrust generated by the thrusters, and x, y, and z representing the positions of the thrusters. The three upper rows in formula (9) represent the directions of thrust generated by the thrusters, and the three lower rows indicate the outer products of the positions of the thrusters and the directions of thrust from the thrusters. With the constraint dimensionality M being 6, and the variable dimensionality N being 8, all the active sets I found by the dual solution candidate searcher are as follows.

Formula 11

$I_1=\{3,4,5,6,7,8\}, I_2=\{2,3,5,6,7,8\}, I_3=\{2,3,4,6,7,8\},$
$\quad I_4=\{2,3,4,5,6,8\}, I_5=\{1,4,5,6,7,8\}, I_6=\{1,3,4,5,7,$
$\quad 8\}, I_7=\{1,3,4,5,6,7\}, I_8=\{1,2,5,6,7,8\}, I_9=\{1,2,4,6,$ $7,8\}, I_{10}=\{1,2,4,5,6,8\}, I_{11}=\{1,2,3,5,7,8\}, I_{12}=\{1, 2,3,5,6,7\}, I_{13}=\{1,2,3,4,7,8\}, I_{14}=\{1,2,3,4,6,7\}, I_{15}=\{1,2,3,4,5,8\}, I_{16}=\{1,2,3,4,5,6\},$  (11)

A dual solution candidate $y_I$ found by the dual solution candidate searcher is represented in the form described below as a function of variables of the directions of thrust generated by the thrusters, or u, v, and w, and variables of the positions of the thrusters, or x, y, and z (excerpts).

Formula 12

$$y_{I_1} = \begin{bmatrix} -\frac{1}{u} & \frac{1}{v} - \frac{x}{uy} & 0 & 0 & 0 & \frac{1}{uy} \end{bmatrix}^T \quad (12)$$

$$y_{I_2} = \begin{bmatrix} -\frac{1}{u} & 0 & \frac{1}{w} - \frac{x}{uz} & 0 & -\frac{1}{uz} & 0 \end{bmatrix}^T$$

$$y_{I_3} = \begin{bmatrix} 0 & \frac{1}{v} & \frac{1}{w} & -\frac{1}{vz-wy} & 0 & 0 \end{bmatrix}^T$$

$$y_{I_4} = \begin{bmatrix} 0 & -\frac{x}{uy} & -\frac{x}{uz} & -\frac{1}{vz-wy} & -\frac{1}{uz} & \frac{1}{uy} \end{bmatrix}^T$$

The dual solution candidate $y_I$ for each active set I from formulas (9) to (11) is represented by a character expression as indicated in formula (12). The solution candidate calculation device 2 stores the dual solution candidates $y_I$ represented by character expressions as in formula (12) into the active set dual solution storage 4 in the form of character expressions in a manner associated with the active sets I.

In Step 1-2, the solution candidate calculation device 2 defines M (constraint dimensionality)-dimensional vectors in the i-th column of the constraint coefficient matrix A as i-th column constraint coefficient vectors $a_i$, and determines an M (constraint dimensionality)×M matrix in which i-th column constraint coefficient vectors $a_k(k \in I)$ are arranged horizontally in ascending order of k, as a base matrix $A_I$. In this step, the constraint coefficient matrix A expressed as the character string is used to determine the base matrix $A_I$ of the M (constraint dimensionality)×M matrix also expressed as a character string.

Additionally, the solution candidate calculation device 2 determines whether the base matrix $A_I$ has a rank of the constraint dimensionality M, or full rank. The base matrix $A_I$ expressed as the character string has a rank that can be represented depending on the character string, and thus the rank is found by formula manipulation. For full rank, the solution candidate calculation device 2 proceeds to Step 1-3. For the rank that is not full rank, the solution candidate calculation device 2 returns to Step 1-2 without storing the active set, and processes the next active set.

The procedure performed by the optimal solution calculation device 3 will now be described. In Step 2-1, the optimal solution calculation device 3 calculates the inner product of the constraint vector b and the dual solution candidate $y_I$ for every active set I stored in the active set dual solution storage 4. In this step, the optimal solution calculation device 3 reads the dual solution candidate $y_I$ associated with each active set I stored in the active set dual solution storage 4 and calculates the inner product of the constraint vector b and the dual solution candidate $y_I$.

In Step 2-2, the optimal solution calculation device 3 defines the active set I that provides the maximum inner product calculated in Step 2-1 as an optimal active set I*, and finds the optimal active set I* in accordance with formula (7).

In Step 2-3, the optimal solution calculation device 3 finds, as the optimal solution x*, a basic feasible solution for formula (2) in the standard linear programming problem with the optimal active set I* as a base. The basic feasible solution is calculated by solving the linear simultaneous equations in formula (8). In this step, the optimal solution calculation device 3 solves simultaneous equations derived from constraint formula (2) in the primal problem. The simultaneous equations indicate that, for the optimal active set I* stored in the active set dual solution storage 4, the product of the M (constraint dimensionality)×M constraint coefficient matrix A and the optimal solution x* that is an M (constraint dimensionality)-dimensional column vector is equal to the constraint vector b. More specifically, the optimal solution calculation device 3 substitutes actual numerical values (e.g., in the above example, directions of thrust generated by the thrusters, and positions) for variables (u, v, w, x, y, and z in formula (9)) in a function (e.g., formula (9)) that correspond to coefficients in the constraint coefficient matrix A to find the M (constraint dimensionality)×M constraint coefficient matrix A, and solves the simultaneous equations to find the optimal solution x*.

The solution candidate calculation device 2 may have the same hardware configuration including the processor 1002, the memory 1003, and the input-output interface 1005 as in FIG. 12 described in Embodiment 1. The optimal solution calculation device 3 may have the same hardware configuration including the processor 1102, the memory 1103, and the input-output interface 1105 as in FIG. 13 described in Embodiment 1.

As described above, the active set dual solution storage 4 in the present embodiment stores a character expression function. Before the execution by the optimal solution calculation device 3, actual values are substituted for the character expression, and the function is calculated to find the constraint coefficient matrix A and the cost vector c. The solution candidate calculation device 2 then performs each step. In this manner, when the constraint coefficient matrix A and the cost vector c are unfixed, the optimal solution to the primal problem is calculated at high speed without iterations through the same procedure as in Embodiments 1 and 2.

For example, spacecrafts may have the same number of thrusters with different specifications. In this case, the representation of the constraint coefficient matrix as a character expression allows the solution candidate calculation device 2 to be used for spacecrafts having particular specifications by entering values about each specification into character expression values.

Embodiment 4

The present embodiment is directed to a spacecraft including a plurality of thrusters for controlling the position and the posture in a translation direction using the plurality of thrusters based on the concept in Embodiments 1 to 3. The number of thrusters is greater than the number of degrees of freedom for control. For example, the system performing six-degree-of-freedom control includes seven or more thrusters.

Figure 6:
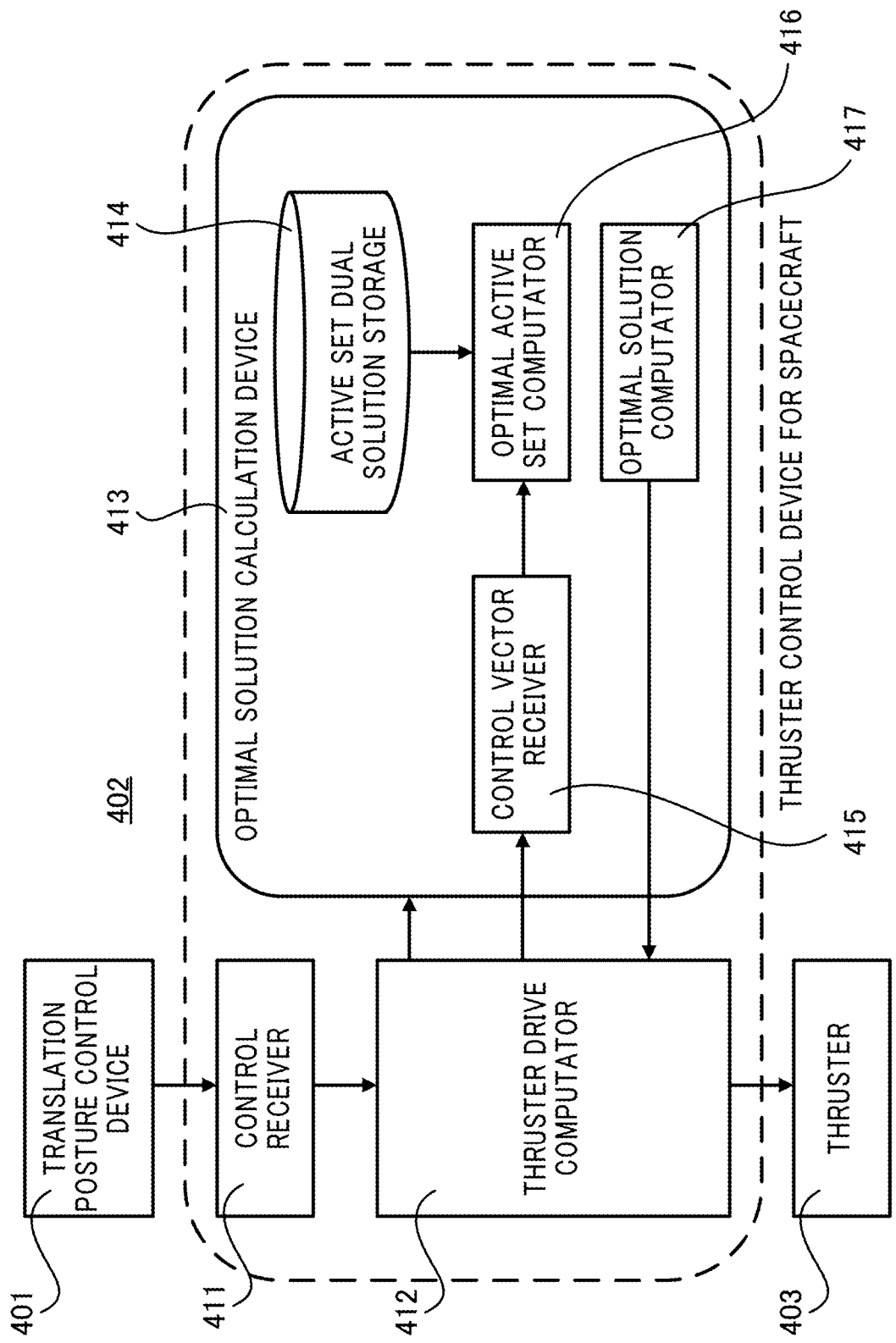
FIG. 6 is a schematic block diagram of a thruster control device for a spacecraft according to Embodiment 4 of the present disclosure.

FIG. 6 is a block diagram of a spacecraft that performs translation and posture control using a plurality of thrusters. In the figure, a spacecraft 400 includes a translation posture control device 401, a thruster control device 402, and thrusters 403. The translation posture control device 401 calculates the quantity of translation and the posture of the spacecraft 400. The thruster control device 402 receives an instruction from the translation posture control device 401 to control the thrusters in the spacecraft 400. The thrusters 403 are to be controlled by the thruster control device 402. The components control the position and the posture of the spacecraft.

The thruster control device 402 includes a control receiver 411, a thruster drive computator 412, and an optimal solution calculation device (circuit) 413. The control receiver 411 receives an instruction from the translation posture control device 401 and receives a translation force and torque to be output by the thrusters 403. The thruster drive computator 412 receives signals (target translation force and torque) from the control receiver 411 and computes propellant injection control signals for each thruster 403. The optimal solution calculation device (circuit) 413 solves, in response to an instruction from the thruster drive computator 412, the above linear programming problem into which an injection quantity optimization problem with the thrusters 403 is transformed based on the signals from the control receiver 411.

To improve numerical stability, the control receiver 411 may be standardized with the force and the torque in the same order. Without the control receiver 411, the thruster drive computator 412 may directly receive signals input from the translation posture control device 401 and representing the translation force and the torque to be output by the thrusters 403.

The optimal solution calculation device (circuit) 413 includes an active set dual solution storage 414, a control vector receiver 415, an optimal active set computator 416, and an optimal solution computator 417. The active set dual solution storage 414 corresponds to the active set dual solution storage in the above embodiment. The control vector receiver 415 receives, from the thruster drive computator 412, a control vector bs corresponding to the time-varying constraint vector b. The optimal active set computator 416 reads dual solution candidates $y_I$ from the active set dual solution storage 414, receives the control vector bs from the control vector receiver 415, and finds the optimal active set I* based on the control vector bs and the dual solution candidates $y_I$. The optimal solution computator 417 finds the optimal solution x* from the optimal active set I*.

The procedure performed by the spacecraft 400 will now be described.

In Step 4-0 as a preparation step, the solution candidate calculation device 2 in the above embodiment stores dual solution candidates $y_I$ associated with active sets I into the active set dual solution storage.

The problem of minimizing the total quantity of injection from the thrusters 403 in the spacecraft 400 can be transformed into a standard linear programming problem represented as formulas (1) to (3), and thus the above embodiment is applicable. The correspondences will now be described.

In formulas (1) to (3) in the above embodiment, the variable vector x is a nonnegative variable vector having dimensions equal in number to the number of thrusters 403 and representing the injection quantity of the thrusters 403 to be optimized, the constraint vector b is a vector having the target translation force and the target torque arranged vertically, and the cost vector c is a vector having all elements being 1 and determined when the quantity to be minimized (total injection quantity) and the variable vector (the quantity of injection from each thruster) are defined. The constraint coefficient matrix A depends on the arrangement of the thrusters 403 and has, as described with reference to formula (9), rows indicating directions of thrust generated by the thrusters and rows indicating the outer products of the positions of the thrusters and the directions of thrust.

In this example, the dimensionality N of the variable vector x is greater than the dimensionality M of the constraint vector b, and the conditions indicated in formulas (1) to (3) in Embodiment 1 are satisfied. In other words, the dimensionality N of the variable vector x, which is the number of thrusters 403, is greater than the degrees of freedom of controlling the spacecraft. For example, for six-degree-of-freedom control with three translational degrees of freedom combined with three rotational degrees of freedom, the spacecraft includes seven or more thrusters 403. The spacecraft control may use any degree of freedom other than six degrees of freedom. For example, when a thruster 403 fails, the spacecraft control may have five or less degrees of freedom.

In the configuration described above, solving a standard linear programming problem with the control vector b, the cost vector c, and the constraint coefficient matrix A defined to find the variable vector x yields the quantity of injection from the thrusters 403 minimizing the total injection quantity, while satisfying the above target thrust and target torque.

In Step 4-0, the solution candidate calculation device 2 in any of the above embodiments is used. The problem receiver 21 predetermines the constraint coefficient matrix A from the arrangement of the thrusters 403 in the spacecraft 400, and receives an N-dimensional cost vector c having elements of 1. The dual solution candidate searcher 22 determines the dual problem (formulas (4) and (5)) of the standard linear programming problem (formulas (1) to (3)) for the spacecraft, finds active sets I and dual solution candidates $y_I$ for the determined dual problem, and stores the active sets I and dual solution candidates $y_I$ into the active set dual solution storage 414 in the spacecraft 400 in a manner associated with each other.

More specifically, the same procedure as in FIG. 2 is performed on the dual problem of the standard linear programming problem defined by the constraint coefficient matrix A found from the arrangement of the thrusters 403 in the spacecraft 400 and the N-dimensional cost vector c having elements of 1.

As described in Embodiment 2, the inverse of the constraint coefficient matrix A may be calculated as a distribution matrix $A_I^{-1}$, and each distribution matrix $A_I^{-1}$ may be stored into the active set dual solution storage 4 in a manner associated with the corresponding active set I. As described in Embodiment 3, the constraint coefficient matrix A and the cost vector c may change as functions of thrust directions and positions of the thrusters 403 represented by the three upper rows indicating the directions of thrust generated by the thrusters 403 and the three lower rows indicating the outer products of the positions and the thrust directions of the thrusters 403.

When a certain component of the cost vector c increases to a greater value, the injection quantity of the corresponding thruster 403 becomes substantially zero. This characteristic may be used. When a thruster 403 fails, the corresponding component of the cost vector c may be increased to a greater value to perform computation through approximately the same processing.

Step 4-0 is performed by the solution candidate calculation device 2 in the above embodiments, and the solution candidate calculation device 2 may have the same hardware configuration including the processor 1002, the memory 1003, and the input-output interface 1005 as in FIG. 12 described in Embodiment 1.

In Step 4-1, the translation posture control device 401 measures the translation position with a global navigation satellite system (GNSS), such as a global positioning system (GPS), and measures the posture with a star sensor to determine the self-position, the speed, the posture, and the angular velocity of the spacecraft 400. Based on the target values of these parameters, or specifically, the target position, the target speed, the target posture, and the target angular velocity of the spacecraft 400, the translation posture control device 401 calculates a target translation force and target torque to achieve translation and posture control. This calculation is, for example, performed under a control law such as proportional-integral-derivative (PID) control that feeds back the difference from the target position.

In Step 4-2, the thruster drive computator 412 calculates the injection quantity of the thrusters 403 to achieve the target translation force and the target torque determined in Step 4-1.

The optimal solution calculation device 3 in any of the above embodiments may be used to calculate the optimal injection quantity of the thrusters 403 at high speed.

More specifically, the optimal solution calculation device 3 corresponds to the optimal solution calculation device 413 in the thruster control device for a spacecraft. The optimal solution calculation device 413 receives, repeatedly over time, a constraint vector b in which the target translation force and the target torque changing over time are arranged vertically, and calculates the optimal solution x* in accordance with the constraint vector b at high speed. The procedure is the same as in FIG. 3.

In Step 2-1, the optimal solution calculation device 413 calculates, for every active set I stored in the active set dual solution storage 414, the inner product of the dual solution candidate $y_I$ and the constraint vector b including the target translation force and the target torque.

In Step 2-2, the optimal solution calculation device 413 defines the active set I that provides the maximum inner product calculated in Step 2-1 as an optimal active set I*, and finds the optimal active set I* in accordance with formula (7).

In Step 2-3, the optimal solution calculation device 413 finds, as the optimal solution x*, a basic feasible solution for formula (2) in the standard linear programming problem with the optimal active set I* as a base. The basic feasible solution is calculated by solving the linear simultaneous equations of formula (8). Formula (8) corresponds to simultaneous equations derived from constraint formula (2) in the primal problem, indicating that the constraint vector b including the target translation force and the target torque is equal to the product of the M (constraint dimensionality)×M constraint coefficient matrix A including rows indicating directions of thrust generated by the thrusters 403 and rows indicating the outer products of the positions of the thrusters and the directions of thrust and the optimal solution x* that is a nonnegative column vector having dimensions equal in number to the number of thrusters 403 and representing the injection quantity of the thrusters 403 to be optimized.

In Step 4-3, the thruster drive computator 412 transmits an instruction including the injection quantity of the thrusters 403 calculated by the optimal solution calculation device 413 in Step 4-2 to the thrusters 403. In response to the instruction, each thruster 403 performs injection in the injection quantity found in Step 4-2 and provides an intended translation force and torque to the spacecraft 400 that minimizes the total injection quantity.

The thruster control device 402 may have the same hardware configuration including the processor 1102, the memory 1103, and the input-output interface 1105 as in FIG. 13 described in Embodiment 1. The input-output interface 1105 allows input into the control receiver 411 and output from the thruster drive computator 412 to the thruster 403. The processor 1102 performs the operations of the thruster drive computator 412, the control vector receiver 415, the optimal active set computator 416, and the optimal solution computator 417. The memory 1103 stores processing programs for the thruster control device 402 and functions as the active set dual solution storage 414. In the present embodiment, the reception device 1106 in FIG. 13 receives information from the translation posture control device 401. The actuators 1108 correspond to the thrusters 403. The actuator control device 1107 corresponds to a part of the thruster drive computator 412.

As described above, the spacecraft according to the present embodiment includes the thrusters 403 as translation and posture control actuators. The matrix A determined from the arrangement of the thrusters 403 and the cost vector c having all elements being 1 are input, and then the dual solution candidates and the active sets obtained by operating the solution candidate calculation device 2 are prestored in the active set dual solution storage 4. The control vector b having the target translation force and the target torque arranged vertically is input, and then the optimal solution calculation device 3 is operated to calculate the injection quantity of the thrusters 403. This process enables high-speed calculation of the injection quantity of the thrusters 403 that minimizes the total thruster injection quantity.

Although the target translation force and the target torque represented by the constraint vector b change in each control cycle, the injection quantity of the thrusters 403 that minimizes the total injection quantity can be calculated in real time with constraints satisfied within a predetermined period of the control cycle without convergence computation. The onboard computer in a spacecraft is to be reliable and resistant to radiation, and usually underperforms ground computers. Thus, reliable calculation of the optimal injection quantity within a predetermined period can ensure reliability. In the present embodiment, dual solution candidates and active sets are found from the matrix A determined from the arrangement of the thrusters 403 fixed on the spacecraft 400 and the cost vector c having all elements being 1, and prestored in the active set dual solution storage 4. This process enables, within a predetermined period, reliable calculation of the injection quantity that satisfies the target translation force and the target torque and minimizes the total injection of the thrusters 403 without convergence calculation in the thruster control device for the spacecraft 400.

Embodiment 5

In the present embodiment, unlike Embodiment 1 directed to the non-degenerate standard linear programming problem, a linear programming problem solving system, a solution candidate calculation device, and an optimal solution calculation device will be described for solving a non-degenerate linear programming problem having a primal problem that is a dual problem of a standard linear programming problem. The present embodiment is directed to a non-degenerate linear programming problem having a primal problem that is a dual problem of a standard linear programming problem. The non-degenerate linear programming problem having a primal problem that is a dual problem of a standard linear programming problem described in the present embodiment is a problem of optimizing (maximizing) an objective function of a variable vector y under constraints represented by simultaneous inequalities having a given constraint coefficient matrix A, a constraint vector c, and a variable vector y. The problem is represented by the formulas below.

Formula 13

$$\max_y b^T y \tag{13}$$

Formula 14

$$\text{s.t. } A^T y \le c \tag{14}$$

In formula (14), c is an N-dimensional constraint vector, y is a variable vector having M dimensions smaller than the dimensionality N of the constraint vector c, and A is an M (the dimensionality of the variable vector y)×N (the dimensionality of the constraint vector c) constraint coefficient matrix. In formula (13), b is an M (the dimensionality of the variable vector y)-dimensional cost vector. Formula (13) represents finding one of the variable vectors y satisfying formula (14) that maximizes the inner product of the variable vector y and the transposed matrix of the cost vector b.

Formulas (13) and (14) are the same as formulas (4) and (5) corresponding to the dual problem of the primal problem that is the standard linear programming problem represented as formulas (1) to (3) in Embodiment 1. The linear programming problem in this embodiment thus has the primal problem that is the dual problem of a standard linear programming problem.

A degenerate problem can be perturbed and transformed into a non-degenerate problem, and thus any degenerate problem can be transformed into a non-degenerate problem and then solved as the above problem.

In the present embodiment, the linear programming problem represented as formulas (13) and (14) in which the constraint coefficient matrix A and the cost vector b are unchangeable, and the constraint vector c varies is solved repeatedly at high speed without convergence calculation.

FIG. 1 is also a block diagram of the linear programming problem solving system for solving the linear programming problem having the primal problem that is the dual problem of a standard linear programming problem according to the present embodiment. In the same manner as Embodiment 1, the linear programming problem solving system 1 receives an input to calculate an output vector that minimizes a linear evaluation function within linear constraints. The linear programming problem solving system 1 includes the solution candidate calculation device 2 and the optimal solution calculation device 3.

The solution candidate calculation device 2 receives an input of unchangeable information for a target linear programming problem, determines the target linear programming problem based on the received information, determines the dual problem of the obtained linear programming problem being a primal problem, finds feasible solution candidates meeting constraints in the determined dual problem and all active sets associated with the solution candidates, and stores the feasible solution candidates and the active sets into the storage.

The optimal solution calculation device 3 receives an input of periodically varying changeable information, selects the optimal active set based on the inner product of the input and each solution candidate found in the solution candidate calculation device 2, and finds and outputs the basic feasible solution corresponding to the active set as an optimal solution.

In the present embodiment, the linear programming problem represented as formulas (13) and (14) in which the constraint coefficient matrix A and the cost vector b are unchangeable, and the constraint vector c varies is solved repeatedly at high speed without convergence calculation. The procedure will now be described.

The solution candidate calculation device 2 first calculates information to be stored in the active set dual solution storage 4. The solution candidate calculation device 2 thus finds the dual problem of the primal problem that is the linear programming problem represented as formulas (13) and (14). This dual problem can be represented, based on formulas (13) and (14), as described below.

Formula 15

$$\min_x c^T x \tag{15}$$

Formula 16

$$\text{s.t. } Ax = b \tag{16}$$

Formula 17

$$x \ge 0 \tag{17}$$

Formula (16) represents simultaneous equations in which the cost vector b is equal to the product of the constraint coefficient matrix A and a solution vector x having N dimensions. Formula (17) shows that the elements of the solution vector x are zero or more. Formula (15) represents finding one of the solution vectors x satisfying formulas (16) and (17) that minimizes the inner product of the constraint vector c and the solution vector x.

The constraints in formulas (16) and (17) can be solved beforehand, because the constraint coefficient matrix A and the cost vector b are fixed. The region (feasible region) satisfying the constraints (formulas (16) and (17)) in the dual problem is a convex region. In accordance with the common characteristics of linear programming problems, one vertex of the convex region is to be the optimal solution (minimizing formula (15)). Based on the above assumption, the vertexes of the convex region may be found as optimal solution candidates for the dual problem.

In the present embodiment, the solution candidate calculation device 2 finds and prestores all optimal solution candidates for the dual problem into the active set dual solution storage 4. The optimal solution calculation device 3 reads the optimal solution candidates from the active set dual solution storage 4 to find the optimal solution that minimizes formula (11).

Figure 7:
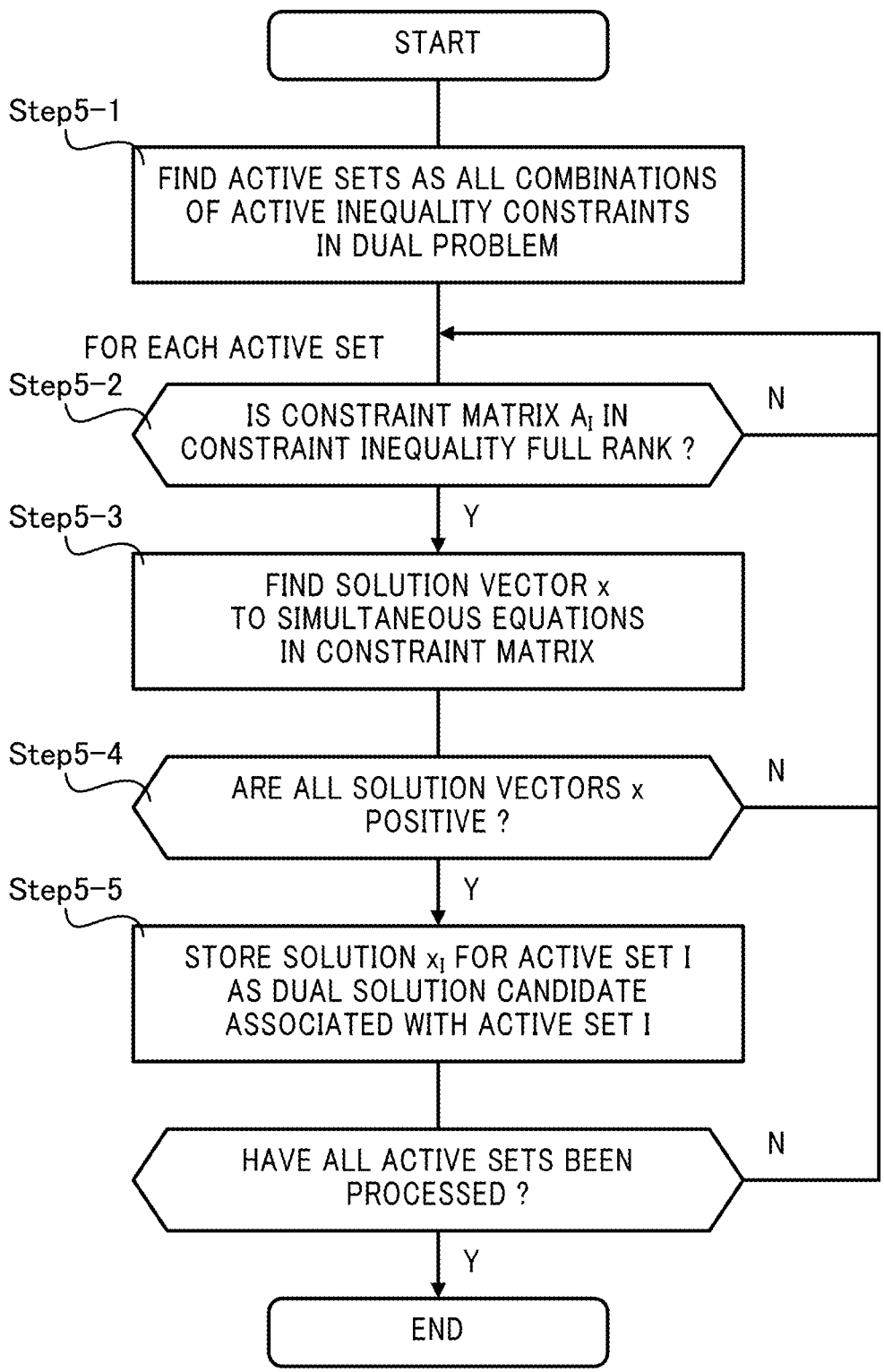
FIG. 7 is a schematic diagram of a solution candidate calculation device according to Embodiment 5 of the present disclosure.

FIG. 7 is a flowchart of the procedure performed by the solution candidate calculation device 2. The procedure will now be described with reference to FIG. 7. The solution vector x has N dimensions. Thus, the dual problem has N inequality constraints (formulas (16) and (17)). The procedure below is preceded by the dual problem generator 221 in the dual solution candidate searcher 22 in FIG. 1 generating the dual problem of the linear programming problem having the primal problem that is the dual problem of the standard linear programming problem input through the problem receiver 21.

In Step 5-1, the solution vector x is an N-dimensional vector. Thus, in the primal problem (formulas (13) and (14), or the dual problem of the standard linear programming problem), when M (the dimensionality of the variable vector y) constraints are active among N (the dimensionality of the constraint vector c) inequality constraints (formula (14)), the combination of the active constraints is referred to as an active set I. Under a complementarity condition, the remaining (N-M) constraints of the inequality constraints (formula (17)) in the dual problem are active.

In Step 5-1, the all-active-set generator 222 in the dual solution candidate searcher 22 in FIG. 1 sets one combination (active set I) of M (the dimensionality of the variable vector y) active constraints. When the solution candidate calculation device 2 returns to Step 5-1 from another step descried below, a new combination is set as an active set I, and the process continues.

In Step 5-2, the all-active-set generator 222 generates a matrix $A_I$ from the constraint coefficient matrix A as a base matrix associated with the active set I, and determines whether the matrix $A_I$ has a rank of the dimensionality M of the variable vector y, or full rank. For the rank of the matrix $A_I$ being full rank, the solution candidate calculation device 2 proceeds to Step 5-3. For the rank that is not full rank, the solution candidate calculation device 2 returns to Step 5-1, and processes the next active set I.

When M (the dimensionality of the variable vector y)-dimensional vectors in the i-th column of the constraint coefficient matrix A are denoted by $a_j$ (1, ... N), the matrix $A_I$ is an M (the dimensionality of the variable vector y)×M matrix in which vectors $a_k$ (where k belongs to the active set I) are arranged horizontally in ascending order of k. More specifically, the matrix $A_I$ is a base matrix, and in Step 5-2, the all-active-set generator 222 checks whether the rank of the base matrix is full rank.

In Step 5-3, the dual solution calculator 223 in the dual solution candidate searcher 22 in FIG. 1 calculates the solution $x_I$ (M-dimensional vector) to the simultaneous equations below.

Formula 18

$$A_I x_I = b \tag{18}$$

In Step 5-4, the dual solution calculator 223 determines whether all the elements of the solution $x_I$ found in Step 5-3 are positive. For all the elements being positive, the solution candidate calculation device 2 proceeds to Step 5-5. For at least one of the elements being not positive, the solution candidate calculation device 2 returns to Step 5-1 and processes the next active set. In Step 5-4, a solution $x_I$ may have an element of zero depending on the values of the constraint coefficient matrix A and the constraint vector c. However, the linear programming problem is non-degenerate, and thus the solution $x_I$ with an element of zero may be left without consideration.

In Step 5-5, the dual solution calculator 223 stores $x_I$ corresponding to the active set I as a dual solution candidate into the active set dual solution storage 4 in a manner associated with the active set I. Subsequently, unless all active sets have undergone the procedure, the solution candidate calculation device 2 returns to Step 5-1 and processes the next active set.

Figure 8:
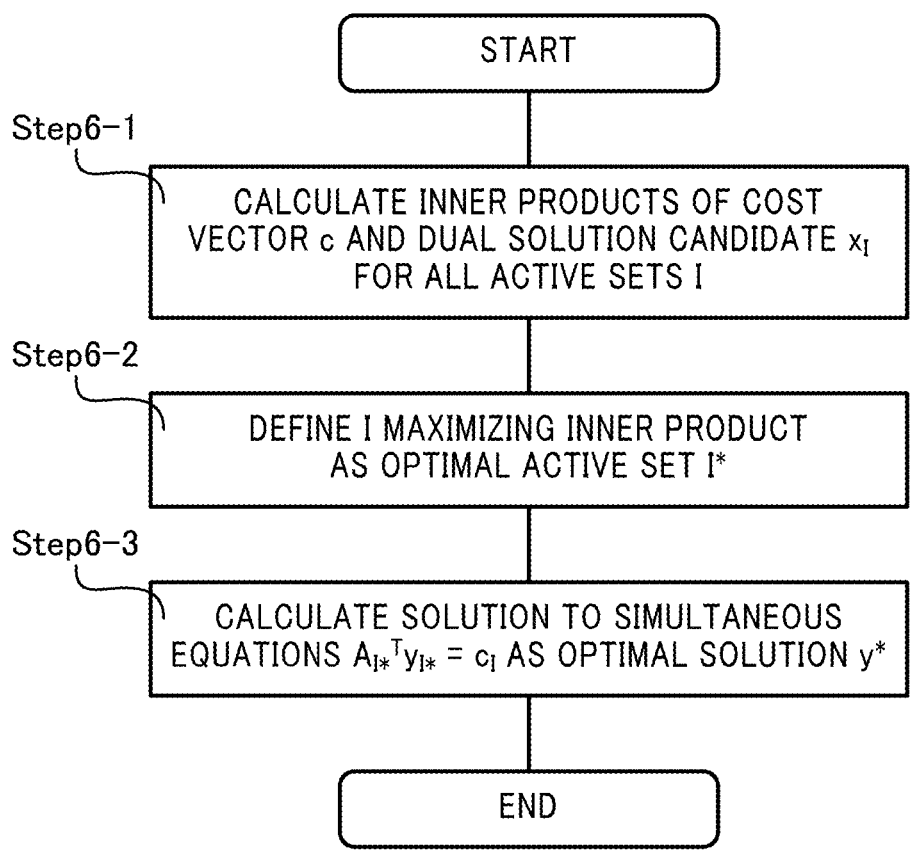
FIG. 8 is a schematic diagram of an optimal solution calculation device according to Embodiment 5 of the present disclosure.

The optimal solution calculation device 3 will now be described. FIG. 8 is a flowchart of the procedure performed by the optimal solution calculation device 3. The optimal solution calculation device 3 receives a varying constraint vector c repeatedly and calculates the corresponding optimal solution y* at high speed without convergence computation.

In Step 6-1, the optimal active set computator 31 in the optimal solution calculation device 3 in FIG. 1 calculates, for every active set I stored in the active set dual solution storage 4, the inner product of the dual solution candidate $x_I$ and a constraint vector $c_I$ received from the control vector receiver 30. The $c_I$ is an M (the dimensionality of the variable vector y)-dimensional vector with the k-th elements of the constraint vector c corresponding to the active constraints indicated in active sets I arranged in ascending order of k.

In Step 6-2, the optimal active set computator 31 finds the active set that minimizes the inner product of the constraint vector $c_I$ and the dual solution candidate $x_I$. The active set that minimizes the inner product is referred to as an optimal active set I*. For a plurality of optimal active sets I*, each set provides the same optimal solution to the primal problem, and thus any one set is selected. This is written with the numerical formula below.

Formula 19

$$I^* = \operatorname*{argmin}_I c_I^T x_I \tag{19}$$

In Step 6-3, the optimal solution computator 32 in the optimal solution calculation device 3 in FIG. 1 transforms, for the optimal active set I* found above, the constraints in the primal problem (formula (14)) into simultaneous equations in which the constraint vector $c_I$ is equal to the product of the solution vector y and the transposed matrix of the constraint coefficient matrix A, and finds the solution to the simultaneous equations. This solution is the optimal solution y* to the solution vector y to be found. The simultaneous equations are represented below.

Formula 20

$$A_{I^*}^T y_{I^*} = c_{I^*} \tag{20}$$

In this manner, the optimal solution y* to the solution vector y in the primal problem is calculated for the constraint vector c.

The solution candidate calculation device 2 may have the same hardware configuration including the processor 1002, the memory 1003, and the input-output interface 1005 as in FIG. 12 described in Embodiment 1. The optimal solution calculation device 3 may have the same hardware configuration including the processor 1102, the memory 1103, and the input-output interface 1105 as in FIG. 13 described in Embodiment 1.

As described above, a linear programming problem having a primal problem that is the dual problem of a standard linear programming problem is solved using the technique described in Embodiment 1. More specifically, the dual problem of a primal problem that is the linear programming problem to be solved is determined, and all active sets of constraints in the determined dual problem are found. Feasible dual solution candidates are then found and stored as dual solution candidates. The optimal active set is selected based on the inner products of the dual solution candidates and the time-varying constraint vector, and the basic feasible solution associated with the selected optimal active set is found.

In this process in the present embodiment, the dual problem of the standard linear programming problem represented as formulas (13) and (14) is the linear programming problem to be solved. In the target linear programming problem, the constraint dimensionality N, which is the number of dimensions of the periodically varying constraint vector c in formula (14), is greater than the variable dimensionality M of the variable vector y. The simultaneous formulas in the constraints are simultaneous inequalities in formula (14). The dual constraints in Embodiment 1 are the M (variable dimensionality) equality constraints represented in formula (16) by the transposed matrix of the constraint coefficient matrix in the target linear programming problem, and the nonnegative inequality constraints on the solution vector in formula (17). The matrix from which the optimal solution computator finds the inverse matrix is a matrix excluding a column vector included in the constraint coefficient matrix A and corresponding to the identifiers of the optimal active set. The identifier of the optimal active set is an index corresponding to i in $a_i$ of the constraint coefficient matrix A.

The linear programming problem solving system according to the present embodiment receives a linear programming problem having a primal problem that is the dual problem of a standard linear programming problem, determines the dual problem of the given linear programming problem being a primal problem, uses the unchangeability of dual problem constraints over time to offline-calculate an optimal solution candidate in the dual problem for each active set I corresponding to a combination of active constraints, and stores the active set and the associated optimal solution candidate into the active set dual solution storage. Thus, the system calculates the optimal active set I*, or the best active set, and the associated basic solution as the optimal solution y* at high speed.

The linear programming problem solving system solves a linear programming problem having a primal problem that is the dual problem of a non-degenerate standard linear programming problem, and the target linear programming problem has the constraint coefficient matrix A and the cost vector b that are fixed, and the constraint vector c that varies. The system includes the solution candidate calculation device 2 that searches for and stores dual solution candidate $x_I$ independent of the constraint vector c and the active sets I associated with the dual solution candidates into the active set dual solution storage 4, and the optimal solution calculation device 3 that calculates the inner products of the constraint vector c and the dual solution candidates $x_I$ stored in the active set dual solution storage 4 and finds, as the optimal solution y*, the basic feasible solution to the primal problem with the maximum-inner-product active set I* as a base. These components enable dual solution candidates $x_I$ to be precalculated offline and eliminate iterative calculation during the process from when the time-varying constraint vector c is received to when the optimal solution y* to the primal problem is calculated. This increases the computing speed and reliability. In addition, estimating the time taken to calculate the optimal solution enables the optimal solution to be found reliably within the control cycle, allowing real-time control without compromising the optimality and the constraints.

Embodiment 6

Figure 9:
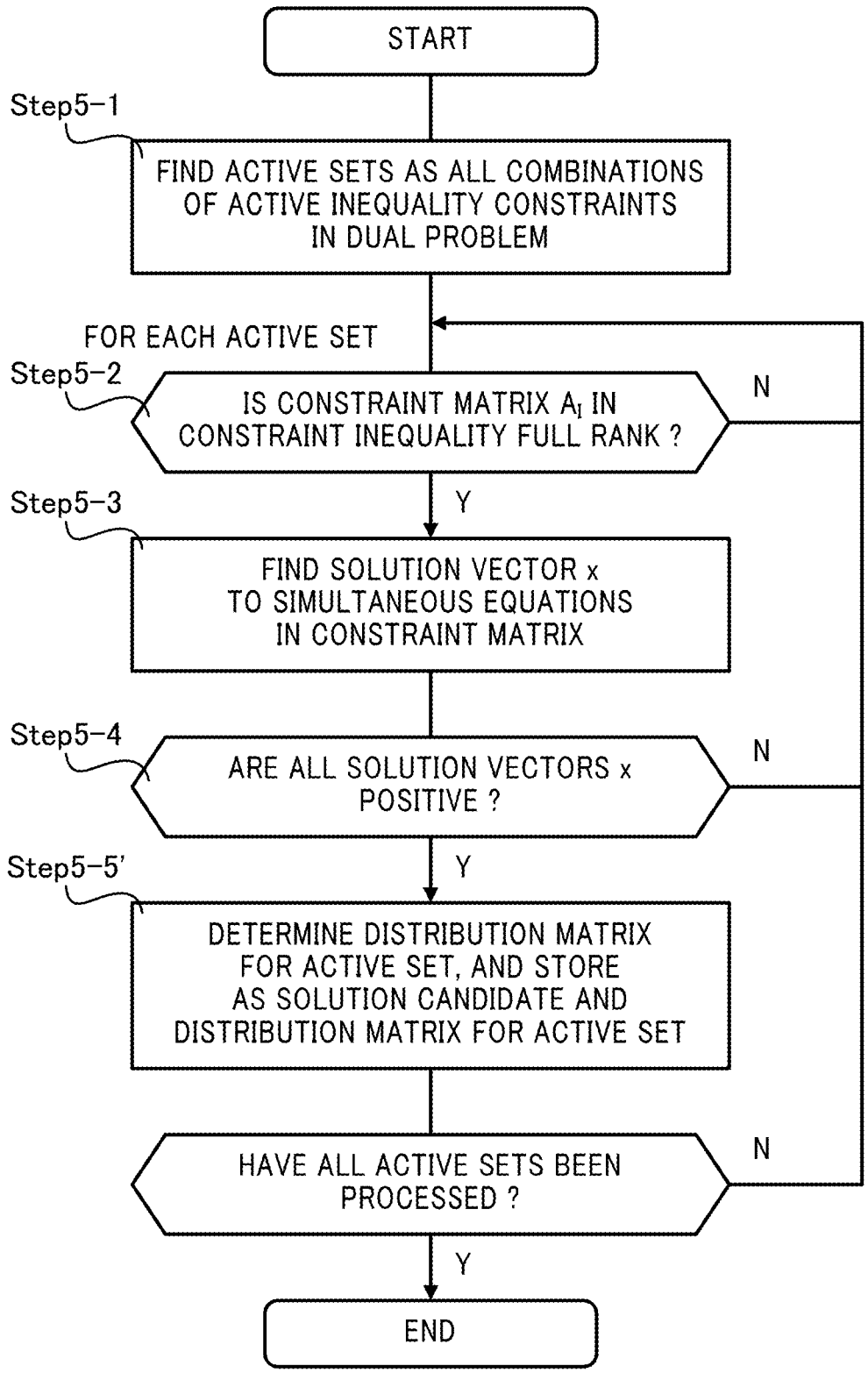
FIG. 9 is a schematic diagram of a solution candidate calculation device according to Embodiment 6 of the present disclosure.

A linear programming problem solving system 1 according to Embodiment 6 includes a solution candidate calculation device 2, an optimal solution calculation device 3, and an active set dual solution storage 4 as in Embodiment 5. In Embodiment 6, in the solution candidate calculation device shown in FIG. 7, additional information is stored in the active set dual solution storage 4 as shown in FIG. 9 to solve the problem at higher speed. More specifically, Step 5-5 for the solution candidate calculation device 2 and Step 6-3 for the optimal solution calculation device 3 are modified in the manner described below.

In Step 5-5', the solution candidate calculation device 2 stores the dual basic solution $x^b_I$ associated with the active set I into the active set dual solution storage 4 as a dual solution candidate $x_I$ (as in Step 1-5 in Embodiment 1). Additionally, the solution candidate calculation device 2 calculates the transposed matrix of the distribution matrix $A_I^{-1}$ that is the inverse of the M (constraint dimensionality)×M constraint coefficient matrix A for each active set I, and stores the transposed matrix of the distribution matrix $A_I^{-1}$ into the active set dual solution storage 4 in a manner associated with the active set I. The distribution matrix $A_I^{-1}$, which is the inverse of the M (constraint dimensionality)×M constraint coefficient matrix A for the active set I, may be found by, for example, . . . . The solution candidate calculation device 2 then returns to Step 5-2 and processes the next active set.

Figure 10:
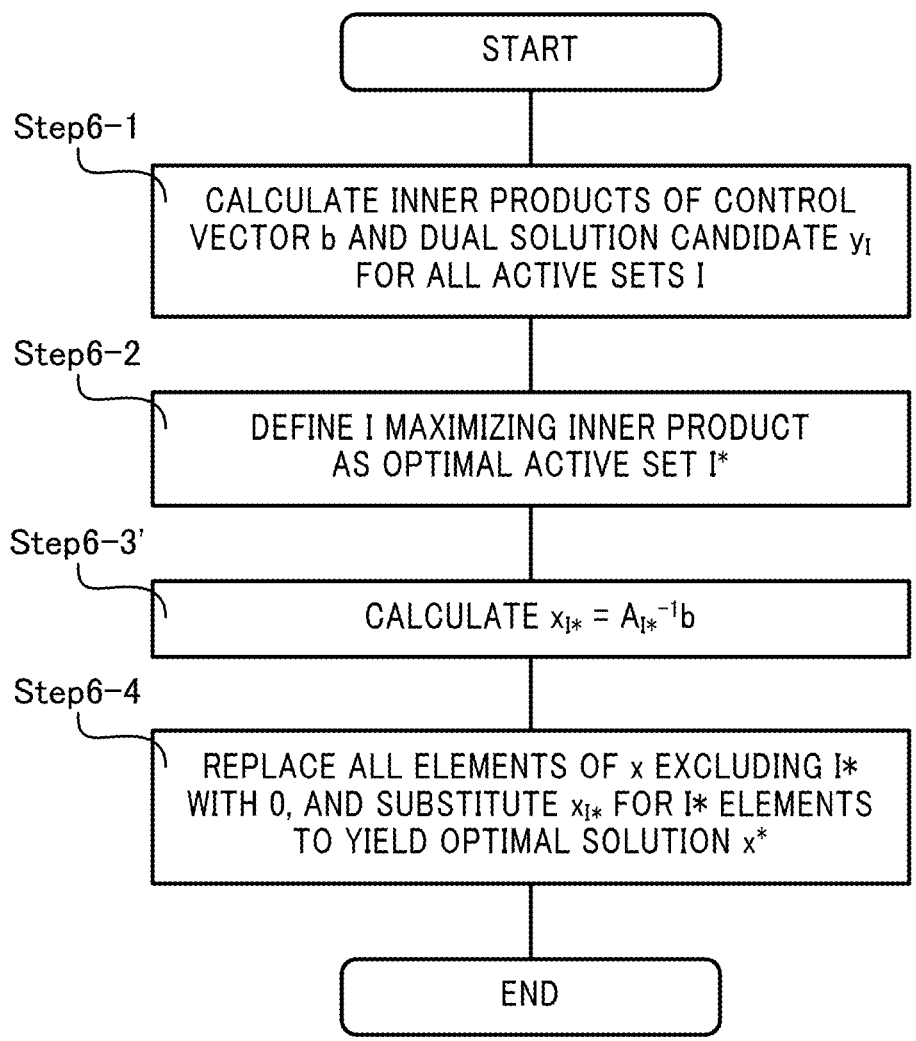
FIG. 10 is a schematic diagram of an optimal solution calculation device according to Embodiment 6 of the present disclosure.

Unlike the process in Embodiment 5 that ends after the search for dual solution candidates $x_I$, the transposed matrix of the distribution matrix $A_I^{-1}$ is precalculated for each optimal solution (active set) to the primal problem. Regarding the optimal solution calculation device 3 in Embodiment 5, Step 6-3 for the optimal solution calculation device 3 is modified in the manner described below as shown in FIG. 10.

In Step 6-3', the optimal solution calculation device 3 reads the transposed matrix of the distribution matrix $A_I^{-1}$ associated with the optimal active set I* stored in the active set dual solution storage 4 as the transposed matrix of the distribution matrix $A_{I*}^{-1}$ for the optimal active set, and finds the product $A_I^{-1T}b$ of the vector and the M (constraint dimensionality)×M distribution matrix for the optimal active set to calculate the optimal solution $y_{I*}$. More specifically, instead of solving the simultaneous equations in formula (20), a matrix-vector product, $y^* = A_I^{-1T}$, is calculated to reduce the amount of computation. In Step 6-3', the use of the already found transposed matrix of the distribution matrix $A_{I*}^{-1}$ eliminates the calculation of the inverse matrix, further reducing the amount of computation of the optimal solution calculation device 3.

The solution candidate calculation device 2 may have the same hardware configuration including the processor 1002, the memory 1003, and the input-output interface 1005 as in FIG. 12 described in Embodiment 1. The optimal solution calculation device 3 may have the same hardware configuration including the processor 1102, the memory 1103, and the input-output interface 1105 as in FIG. 13 described in Embodiment 1.

In the linear programming problem solving system 1 according to the present embodiment, the solution candidate calculation device 2 calculates the distribution matrix $A_I^{-1}$, or the inverse of the M (constraint dimensionality)×M constraint coefficient matrix A for each active set I, and the transposed matrix of the distribution matrix $A_I^{-1}$, and stores the distribution matrix $A_I^{-1}$ and transposed matrix into the active set dual solution storage 4 in a manner associated with the active set I, and the optimal solution calculation device 3 reads the distribution matrix $A_I^{-1T}$ associated with the optimal active set I* stored in the active set dual solution storage 4 to calculate the optimal solution $y_I$. This process further reduces the amount of computation of the optimal solution calculation device 3. The control cycle thus becomes shorter to achieve control with quick or smooth responses.

Embodiment 7

The present embodiment is directed to a flying object including a plurality of rotors for controlling the translation and the posture using the plurality of rotors based on the concept in Embodiment 5 or 6. The flying object may be a drone. A drone is incapable of outputting a thrust in more than one direction, and the user may intend to quickly change the posture with a higher output priority assigned to the posture changing torque than the thrust. The problem of achieving the nearest possible target thrust and the nearest possible target torque that achieves the target posture within the upper and lower bounds of the rotor rotational speed may thus be a linear programming problem of assigning a weighted error to the target translation force and the target torque and minimizing the weighted error.

In Embodiment 4, the thrusters outnumber the degrees of freedom of control. In the present embodiment, the flying object may have any number of thrust generators.

The problem of minimizing the weighted error on the target translation force and torque within upper and lower bounds of rotor thrust includes solving a linear programming problem represented as formulas (13) and (14) and optimizing the solution vector y, and thus Embodiments 5 and 6 are applicable. A device will now be described for rotor control with the target posture having a higher priority than the target thrust of a drone including a plurality of rotors that output a thrust in one direction within upper and lower bounds of the rotational speed of the rotors. A method will be described first for applying the problem in the present embodiment to the linear programming problem in Embodiment 5.

A column vector having an arrangement of thrusts of the drone rotors is defined as a rotor thrust vector u, and a column vector having an arrangement of translation force and torque output to the drone when the rotors provide the rotor thrust vector u is defined as a drone force vector f. The drone force vector f has a relationship with the rotor thrust vector u, represented using a constant matrix B determined based on the arrangement of the drone rotors and the characteristics of the rotors. More specifically, with the constant matrix B having elements of constants, the drone force vector f and the rotor thrust vector u have the linear relationship below.

Formula 21

$$f = Bu \qquad (21)$$

The constant matrix B is a constant matrix determined based on the rotor arrangement and the rotor characteristics. The rotor thrust vector u representing the thrusts of the rotors has the upper bound $u_{max}$ and the lower bound $u_{min}$, which are expressed by the inequality below.

Formula 22

$$u_{min} \leq u \leq u_{max} \qquad (22)$$

When a column vector having an arrangement of the drone target translation force and target torque to be targets is defined as a target drone force vector $f_d$, the problem of minimizing the weighted error between the target translation force and target torque, and the drone translation force and the torque by the solution rotor thrust vector u is formulated below.

Formula 23

$$\min_{u} \|W(f - f_d)\|_1 \qquad (23)$$

Formula 24

$$\text{s.t.} \quad u_{min} \leq u \leq u_{max} \qquad (24)$$

The double vertical-line sign having a subscript of 1 and holding a vector represents the vector 1-norm. Formula (24) represents the upper and lower bounds of the solution rotor thrust vector u. Under the condition in formula (24), formula (23) represents minimizing 1-norm of the vector obtained by multiplying a weighting matrix W by the difference between the drone force vector f and the target drone force vector $f_d$.

Formulas (23) and (24) above can be transformed as described below into a linear programming problem equivalent to the linear programming problem (problem described in Embodiment 5) corresponding to the dual problem of a standard linear programming problem being a primal problem.

Formula 25

$$\max_{y} b^T y \qquad (25)$$

Formula 26

$$\text{s.t.} \quad A^T y \leq c \qquad (26)$$

The transposed matrix $A^T$ of the constraint coefficient matrix, the cost vector b, and the constraint vector c in Embodiment 5 are expressed below.

Formula 27

$$A^T = \begin{bmatrix} I_n & O_{n \times 6} \\ -I_n & O_{n \times 6} \\ WB & -I_6 \\ -WB & -I_6 \end{bmatrix} \qquad (27)$$

Formula 28

$$b = [0_n^T - 1_6^T]^T \qquad (28)$$

Formula 29

$$C = \begin{bmatrix} u_{max} \\ -u_{min} \\ Wf_d \\ -Wf_d \end{bmatrix} \qquad (29)$$

In the formulas, n is the number of rotors in the drone, $I_n$ is n (the number of rotors)-dimensional unit vector, $0_{n \times 6}$ is an n×6 zero matrix, $0_n$ is a zero vector with n (the number of rotors) zeros arranged vertically, and $1_6$ is a vector with six ones arranged vertically. The solution vector y is expressed as $y = [u^T \eta^T]^T$ using the rotor thrust vector u having n (the number of rotors) elements, and a virtual variable η having six elements. The elements of the virtual variable η represent the absolute values of the elements of a vector W(f−fd), in which the weighting matrix W is multiplied by the difference between the drone force vector f and the target drone force vector $f_d$. The number six indicates the total degrees of freedom having three translational degrees of freedom and three rotational degrees of freedom.

In formula (26), c is an N-dimensional constraint vector, y is a variable vector having M dimensions smaller than the dimensionality N of the constraint vector c, and A is an M (the dimensionality of the variable vector y)×N (the dimensionality of the constraint vector c) constraint coefficient matrix. In formula (25), b is an M (the dimensionality of the variable vector y)-dimensional cost vector. Formula (25) represents finding one of the variable vectors y satisfying formula (26) that maximizes the inner product of the cost vector b and the variable vector y.

Formula (27) is the transposed matrix of the constraint coefficient matrix A in formula (14). The first n rows indicate that the thrusts of the rotors are equal to or lower than the upper bound $u_{max}$. The next n rows indicate that the thrusts of the rotors are equal to or higher than the lower bound $u_{min}$. The remaining 12 rows indicate inequalities added when formula (23) is transformed into a linear programming problem. The 12 rows represent a natural relation about the virtual variable η, indicating that each element of the vector obtained by multiplying the weighting matrix W by the difference between the drone force vector f and the target drone force vector $f_d$ is equal to or lower than the absolute value of each element, and equal to or higher than the value obtained by multiplying the absolute value of each element by −1.

Formula (28) indicates the cost vector b in which the first n (the number of rotors) elements are 0, and the next six elements are −1.

Formula (29) is the constraint vector c indicating that the first n (the number of rotors) elements represent the upper bound $u_{max}$, the subsequent n (the number of rotors) elements represent the negative vector of the lower bound $u_{min}$, the next six (the number of virtual variables) elements represent the product $Wf_d$ of the weighting matrix W and the target drone force vector $f_d$, and the next six (the number of virtual variables) elements represent $-Wf_d$, or the negative vector of the product $Wf_d$.

In this manner, the problem of minimizing the weighted error between the drone target translation force and target torque, and the drone translation force and torque by the solution rotor thrust vector u can be expressed as a linear programming problem having a primal problem that is the dual problem of the standard linear programming problem represented as formulas (13) and (14) in Embodiment 5. Thus, the optimal solution y* of the solution vector y represented by $[u^T η^T]^T$ can be found in accordance with Embodiment 5 or 6. The determination of the optimal solution y* allows the optimal rotor thrust vector u* to be derived. An example in accordance with Embodiment 5 will now be described.

As described above, a flying object, or for example, a drone, may have any number of thrust generators for the reasons below. In Embodiment 4, the number of thrusters, N, is the number of dimensions of the variable vector x, and the number of dimensions of the variable vector x, N, is greater than the number of constraints, M. For the drone in the present embodiment, the dimensionality of the variable vector y, M, is to be greater than the number of constraints, N. However, the transformation into the linear programming problem always causes M (the dimensionality of the variable vector y) to be greater than N (the number of constraints) in accordance with formulas (28) and (29) above, irrespective of n (the number of rotors).

More specifically, the number of constraints N is 2*n+12, where the number of rotors n is doubled by the upper and lower bounds of rotor thrust, to which 12, the number of inequalities, is added when formula (23) is transformed into the linear programming problem. The dimensionality M of the variable vector y is n+6, where the number of rotors n is added to the number of degrees of freedom 6. Consequently, the number of constraints N is to be greater than the dimensionality M of the variable vector y.

Although an example of six-degree-of-freedom drone control has been described, a typical multicopter has rotors 703 all facing in the same direction, and thus control is limited to four degrees of freedom having one translational degree of freedom and three rotational degrees of freedom. Also in this case, the number of constraints N is 2*n+8, and the dimensionality M of the variable vector y is n+4. Consequently, the number of constraints N is to be greater than the dimensionality M of the variable vector y.

FIG. 1 is also a block diagram of a linear programming problem solving system for solving the linear programming problem according to the present embodiment. In the same manner as Embodiment 1, the linear programming problem solving system 1 receives an input to calculate an output vector that minimizes a linear evaluation function within linear constraints. The linear programming problem solving system 1 includes the solution candidate calculation device 2 and the optimal solution calculation device 3. The solution candidate calculation device 2 receives an input of unchangeable information for a target linear programming problem, determines the target linear programming problem based on the received information, determines the dual problem of the obtained linear programming problem being a primal problem, finds feasible solution candidates meeting constraints in the determined dual problem and all active sets associated with the solution candidates, and stores the feasible solution candidates and the active sets into the storage. The optimal solution calculation device 3 receives an input of periodically varying changeable information, selects the optimal active set based on the inner product of the input and each solution candidate found in the solution candidate calculation device 2, and finds and outputs the basic feasible solution corresponding to the active set as an optimal solution.

A flying object control device includes rotors equal in number to a variable dimensionality. The flying object control device includes a control receiver that receives an input of a translation force and torque to be provided by the rotors, and a rotor drive computator that generates a constraint vector based on the information about the translation force and the torque and inputs the constraint vector into a constraint vector receiver, causes an optimal active set computator to find an optimal active set, causes a solution computator to find an optimal solution to a variable vector from the optimal active set, and generates, based on the resultant variable vector, a signal to be output to the rotors. The constraint dimensionality is greater than the variable dimensionality, the simultaneous formulas are simultaneous inequalities, the dual constraints are equality constraints equal in number to the variable dimensionality and represented by a transposed matrix of the constraint coefficient matrix and are nonnegative constraints on a solution vector, and the optimal active set computator finds an active set minimizing the determined inner product as the optimal active set.

Figure 11:
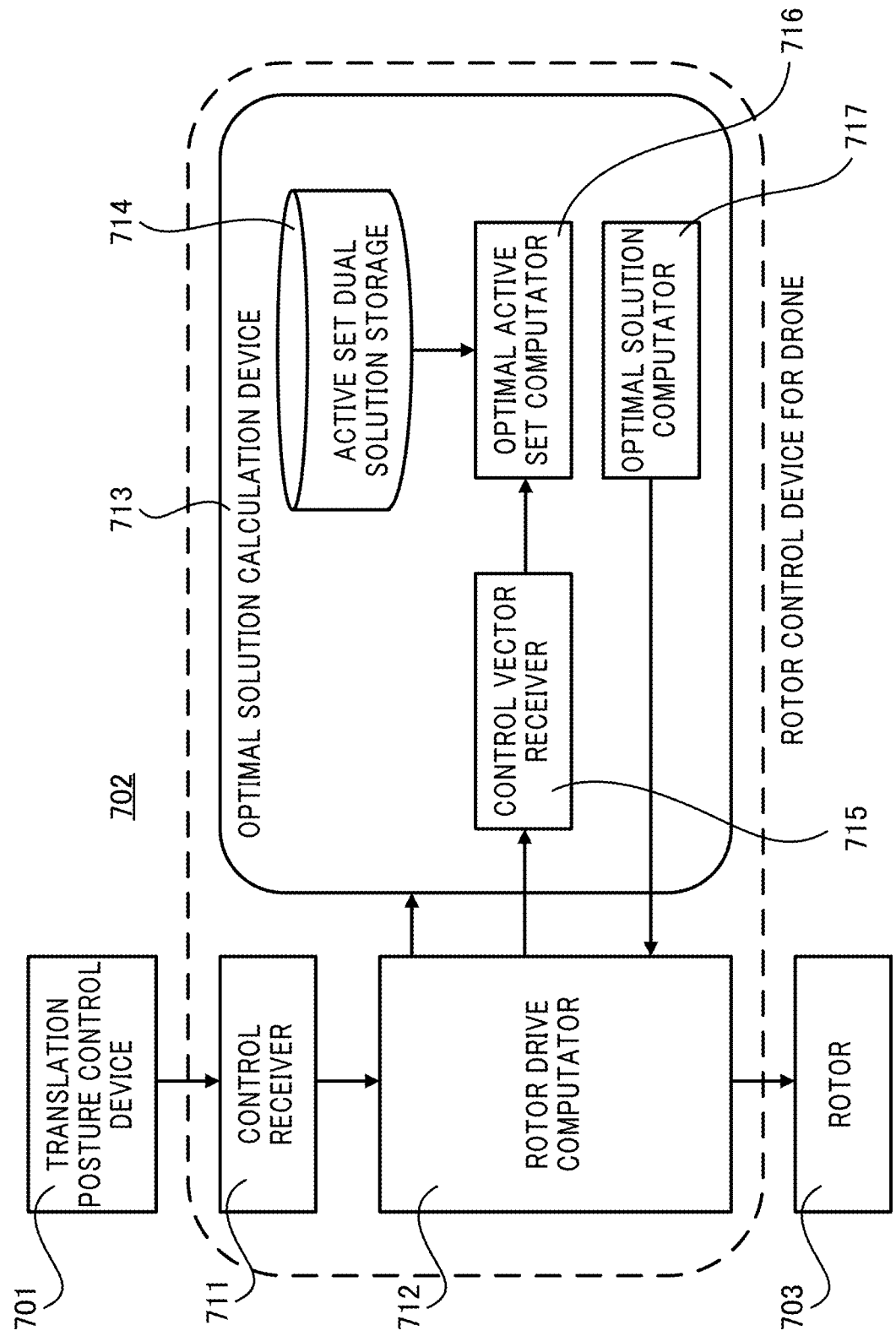
FIG. 11 is a schematic diagram of a flying object rotor control device according to Embodiment 7 of the present disclosure.

FIG. 11 is a block diagram of a drone that performs translation and posture control using a plurality of rotors according to the present embodiment. In the figure, a drone 700 includes a translation posture control device 701, a rotor control device 702, and rotors 703. The translation posture control device 701 calculates the quantity of translation and the posture of the drone 700. The rotor control device 702 receives an instruction from the translation posture control device 701 to control the rotors in the drone 700. The rotors 703 are controlled by the rotor control device. The components control the position and the posture of the drone.

The rotor control device 702 includes a control receiver 711, a rotor drive computator 712, and an optimal solution calculation device (circuit) 713. The control receiver 711 receives an instruction from the translation posture control device 701 and receives a translation force and torque to be output by the rotors 703. The rotor drive computator 712 receives target translation force and torque signals from the control receiver 711 and computes control signals for controlling the rotation of each rotor 703. The optimal solution calculation device (circuit) 713 solves, in response to an instruction from the rotor drive computator 712, the above linear programming problem in Embodiments 5 and 6, into which a rotation amount optimization problem with the rotors 703 is transformed based on the signals from the control receiver 711.

To improve numerical stability, the control receiver 711 may be standardized with the translation force and the torque in the same order. Without the control receiver 711, the rotor drive computator 712 may directly receive signals from the translation posture control device 701 that represent the translation force and the torque to be output by the rotors 703.

The optimal solution calculation device (circuit) 713 includes an active set dual solution storage 714, a control vector receiver 715, an optimal active set computator 716, and an optimal solution computator 717. The active set dual solution storage 714 corresponds to the active set dual solution storage 4 in Embodiments 5 and 6 described above. The control vector receiver 715 receives, from the rotor drive computator 712, a target drone force vector $f_d$ corresponding to the time-varying constraint vector c. The optimal active set computator 716 reads dual solution candidates $x_I$ from the active set dual solution storage 714, receives the constraint vector c from the control vector receiver 715, and finds the optimal active set I* based on the constraint vector c and the dual solution candidates $x_I$. The optimal solution computator 717 finds the optimal solution y* from the optimal active set I*.

The procedure performed by the drone 700 will now be described. The problem in the present embodiment is thus a linear programming problem of assigning a weighted error to the target translation force and the target torque of the drone and minimizing the weighted error. Formulas (25) and (26) in the resultant linear programming problem are the same as formulas (13) and (14) in Embodiment 5, and thus Embodiment 5 is applicable.

In Step 6-0 as a preparation step, the solution candidate calculation device 2 in Embodiment 5 or 6 above stores dual solution candidates $x_I$ associated with active sets I into the active set dual solution storage.

In Step 6-0, the solution candidate calculation device 2 in Embodiment 5 or 6 is used. The problem receiver 21 predetermines the constraint coefficient matrix A from the arrangement and the weight of the rotors 703 in the drone 700 in accordance with formula (27), and receives a cost vector b in accordance with formula (28). The dual solution candidate searcher 22 determines the dual problem of the linear programming problem for the drone, finds active sets I and dual solution candidates $x_I$ for the determined dual problem, and stores the active sets I and the dual solution candidates $x_I$ into the active set dual solution storage 714 in the drone 700 in a manner associated with each other.

Step 6-0 is performed by the solution candidate calculation device 2 in the above embodiments, and the solution candidate calculation device 2 may have the same hardware configuration including the processor 1002, the memory 1003, and the input-output interface 1005 as in FIG. 12 described in Embodiment 1.

In Step 6-1, the translation posture control device 701 calculates a target translation force and torque to achieve translation and posture control based on the self-position, the speed, the posture, and the angular velocity, and the target values of them, or specifically, the target position, the target speed, the target posture, and the target angular velocity. This calculation is, for example, performed under a control law such as PID control that feeds back the difference from the target position.

In Step 6-2, the rotor drive computator 712 calculates the rotor thrusts to achieve a translation force and torque nearest possible to the target translation force and torque determined in Step 6-1. In this state, the problem of minimizing the weighted error on the target translation force and torque within upper and lower bounds of rotor thrust includes solving linear programming problem formulas (25) and (26) defined in formulas (27) to (29) as described above to find the optimal solution y* including the thrust of each rotor.

In this step, the control vector receiver 715 receives the target drone force vector $f_d$ from the rotor drive computator 712, and finds the constraint vector c from the target drone force vector $f_d$, the weight vector W, the upper bound $u_{max}$, and the lower bound $u_{min}$ in formula (29). The optimal active set computator 716 finds the optimal active set I, or the optimal dual solution $x_{I*}$, that minimizes the inner product of the dual solution candidates $x_I$ and the transposed matrix of the constraint vector $c_I$ associated with the active sets I stored in the active set dual solution storage 714.

In Step 6-3, the optimal solution computator 717 transforms, for the optimal active set I* found in Step 6-2, some constraints (formula (26)) in the primal problem (formulas (25) and (26)) into simultaneous equations ($A^T_{I*} y_{I*} = c_{I*}$, identical to formula (20)), and finds the solution to the simultaneous equations. This solution is the optimal solution y* to the solution vector y to be found. The simultaneous equations are represented by formula (20). Additionally, the optimal solution y* is $[u^T \eta^T]^T$, and thus each rotor thrust vector u* is derived from the optimal solution y*.

In Step 6-4, the rotors 703 receive an instruction including the control amount for the rotors 703 calculated in Step 7-2. The rotors 703 are thus controlled in accordance with the control amount for the rotors 703 determined in Step 7-2. The drone 700 is then controlled to quickly change the posture with a higher output priority assigned to the posture changing torque than the thrust.

The rotor control device 702 may have the same hardware configuration including the processor 1102, the memory 1103, and the input-output interface 1105 as in FIG. 13 described in Embodiment 1. The input-output interface 1105 allows input into the control receiver 711 and output from the rotor drive computator 712 to the rotors 703. The processor 1102 performs the operations of the rotor drive computator 712, the control vector receiver 715, the optimal active set computator 716, and the optimal solution computator 717. The memory 1103 stores processing programs for the rotor control device 702 and functions as the active set dual solution storage 714. In the present embodiment, the reception device 1106 in FIG. 13 receives information from the translation posture control device 701. The actuators 1108 correspond to the rotors 703. The actuator control device 1107 corresponds to a part of the rotor drive computator 712.

As described above, a linear programming problem having a primal problem that is the dual problem of the standard linear programming problem represented as formulas (25) and (26) is solved using the technique described in Embodiment 1. More specifically, the dual problem of a primal problem that is the linear programming problem to be solved is determined, and all active sets of constraints in the determined dual problem are found. Feasible dual solution candidates are then found and stored as dual solution candidates. The optimal active set is selected based on the inner products of the dual solution candidates and the time-varying constraint vector, and the basic feasible solution associated with the selected optimal active set is found.

In this process in the present embodiment, the dual problem of the standard linear programming problem represented as formulas (25) and (26) is the linear programming problem to be solved. In the target linear programming problem, the constraint dimensionality N, which is the number of dimensions of the periodically varying constraint vector c in formula (29), is greater than the variable dimensionality M of the variable (solution) vector y represented as $y=[u^T \eta^T]^T$ using the rotor thrust vector u having n (the number of rotors) elements and the virtual variable $\eta$ having six elements. The simultaneous formulas in the constraints are simultaneous inequalities in formula (26). The dual constraints in Embodiment 1 are the M (variable dimensionality) equality constraints represented in formula (16) as the transposed matrix of the constraint coefficient matrix in the target linear programming problem, and the nonnegative inequality constraints on the solution vector in formula (17). The matrix from which the optimal solution computator finds the inverse matrix is a matrix excluding a column vector included in the constraint coefficient matrix A and corresponding to the identifiers of the optimal active set. The identifier of the optimal active set is an index corresponding to i in $a_i$ of the constraint coefficient matrix A.

The drone according to the present embodiment includes the rotors as translation and posture control actuators. The matrix $A^T$ determined from the rotor arrangement, the rotor characteristics, and the weight matrix, and the cost vector b having elements all being 0 or −1 are input, and then the dual solution candidates $y_I$ and the active sets I obtained by the solution candidate calculation device 2 are stored in the active set dual solution storage 4. The constraint vector c determined by the upper and lower bounds of the rotor thrust vector u, the weight matrix, and the target translation force and torque is input into the optimal solution calculation device 3. This process enables high-speed calculation of the rotor thrust that minimizes the weighted error on the target translation force and torque within the upper and lower bounds.

The plurality of rotors may not have the same thrust direction. The rotors may be arranged to generate thrusts in different directions. In this case, the rotor thrust direction is specified in the matrix $A^T$. While the drone is flying, the rotors face in the same direction.

However, the rotors in the drone may not yield a thrust in more than one direction depending on the arrangement of the rotors. In this case, intended control is allowed by creating a weight matrix that assigns a higher priority to posture control than translation. In the present embodiment, the optimal rotor thrust is determined at high speed within upper and lower bounds to prevent the drone from falling or enables the drone to perform an acrobatic flight.

The drone mainly described above may be replaced with any flying object including a plurality of rotors or thrust generators. In particular, the present embodiment is applicable to a flying object with rotors or thrust generators having a static thrust direction to produce the same advantageous effects as described above.

REFERENCE SIGNS LIST

1 Linear programming problem solving system
2 Solution candidate calculation device
3 Optimal solution calculation device
4 Active set dual solution storage
21 Problem receiver
22 Dual solution candidate searcher
221 Dual problem generator
222 All-active-set generator
223 Dual solution calculator
30 Control vector receiver
31 Optimal active set computator
32 Optimal solution computator
401 Translation posture control device
402 Thruster control device
403 Thruster
411 Control receiver
412 Thruster drive computator
413 Optimal solution calculation device
414 Active set dual solution storage
415 Control vector receiver
416 Optimal active set computator
417 Optimal solution computator
701 Translation posture control device
702 Rotor control device
703 Rotor
711 Control receiver
712 Rotor drive computator
713 Optimal solution calculation device
714 Active set dual solution storage
715 Control vector receiver
716 Optimal active set computator
717 Optimal solution computator

The invention claimed is:

1. A spacecraft thrusters control system comprising:
a thruster interface connected to thrusters equal in number to a variable dimensionality;
processing circuitry configured as a dual solution candidate searcher to receive an input of information about a constraint coefficient matrix and a cost vector, determine a dual problem of a linear programming problem being a primal problem and all active sets representing combinations of active formulas in constraints of the dual problem, find, for each of the active sets, a feasible dual solution candidate meeting the constraints, and store the feasible dual solution candidate into a storage in a manner associated with a corresponding one of the active sets; and
the processing circuitry further configured as an optimal solution calculation device to receive an input of a constraint vector varying at any time, select an optimal one of the active sets as an optimal active set based on an inner product of the constraint vector varying at any time and the feasible dual solution candidate stored in the storage, and find and output a basic feasible solution corresponding to the selected optimal active set as an optimal solution to find a solution to the linear programming problem of optimizing an objective function of a variable vector and the cost vector under constraints represented by simultaneous formulas having a given constraint coefficient matrix, the constraint vector varying at any time, and the variable vector including a variable having variable dimensionality different from a constraint dimensionality of the constraint vector varying at any time, wherein the optimal solution represents injection quantity for the spacecraft thrusters.

2. The spacecraft thrusters control system according to claim 1, wherein the dual solution candidate searcher determines the dual problem as a problem including dual constraints having formulas equal in number to the variable dimensionality, the active sets are each expressed as formula identifiers indicating, among the formulas in the dual constraints, a combination of active formulas equal in number to a smaller one of the variable dimensionality and the constraint dimensionality, the feasible dual solution candidate is a solution vector satisfying the formulas in the dual constraints indicated by the formula identifiers in the corresponding active set, and the optimal solution calculation device includes an optimal solution computator to find an optimal solution to the variable vector based on a product of the constraint vector and an inverse matrix of a matrix found from the constraint coefficient matrix using information about the optimal active set.

3. The spacecraft thrusters control system according to claim 2, wherein the constraint dimensionality is smaller than the variable dimensionality, the variable vector is nonnegative, the simultaneous formulas are simultaneous equations, the dual constraints are inequality constraints equal in number to the variable dimensionality and represented by a transposed matrix of the constraint coefficient matrix, the optimal solution calculation device includes an optimal active set computator to find an active set maximizing the determined inner product as the optimal active set, and the matrix from which the optimal solution computator finds the inverse matrix is a matrix having an arrangement of a column vector included in the constraint coefficient matrix and corresponding to the formula identifiers of the optimal active set.

4. The spacecraft thrusters control system according to claim 2, wherein the constraint dimensionality is greater than the variable dimensionality, the simultaneous formulas are simultaneous inequalities, the dual constraints include equality constraints equal in number to the variable dimensionality and represented by a transposed matrix of the constraint coefficient matrix and nonnegative inequality constraints on the solution vector, the optimal solution calculation device includes an optimal active set computator to find an active set minimizing the determined inner product as the optimal active set, and the matrix from which the optimal solution computator finds the inverse matrix is a matrix excluding a column vector included in the constraint coefficient matrix and corresponding to the formula identifiers of the optimal active set.

5. A spacecraft, comprising:

thrusters equal in number to a variable dimensionality; and a thruster control circuit for a spacecraft including processing circuitry configured by software as a thruster drive computator to generate a constraint vector varying at any time based on a translation force and a torque to be provided by the spacecraft, to output information about the constraint vector varying at any time, and to generate, based on a resultant variable vector, a signal to be output to the thrusters and to control an operation of the thrusters, and an optimal solution calculation circuit configured as a linear programming problem solving system to find a solution to a linear programming problem of optimizing an objective function of a variable vector and a cost vector under constraints represented by simultaneous formulas having a given constraint coefficient matrix, the constraint vector varying at any time, and the variable vector including a variable having the variable dimensionality different from a constraint dimensionality of the constraint vector varying at any time, the optimal solution calculation circuit including an active set dual solution storage including a memory to store information about a dual problem of the linear programming problem being a primal problem and active sets representing combinations of active formulas in dual constraints being constraints in the dual problem, in a manner associated with a feasible dual solution candidate meeting the constraints for each of the active sets, a constraint vector receiver to receive the information about the constraint vector varying at any time, an optimal active set computator to select an optimal one of the active sets as an optimal active set based on an inner product of the constraint vector and the feasible dual solution candidate stored in the storage, and an optimal solution computator to find and output, as an optimal solution, a basic feasible solution corresponding to the active set selected by the optimal active set computator, wherein the constraint dimensionality is smaller than the variable dimensionality, the variable vector is nonnegative, the simultaneous formulas are simultaneous equations, the dual constraints are inequality constraints equal in number to the variable dimensionality and represented by a transposed matrix of the constraint coefficient matrix, the optimal active set computator finds an active set maximizing the determined inner product as the optimal active set, and the optimal solution represents injection quantity for the thrusters.

6. A flying object, comprising:

rotors equal in number to a variable dimensionality; and a rotor control circuit including processing circuitry configured by software as a rotor drive computator to generate a constraint vector varying at any time based on a translation force and a torque to be provided by the rotors, to output information about the constraint vector varying at any time, and to generate, based on a resultant variable vector, a signal to be output to the rotors and to control an operation of the rotors, and an optimal solution calculation circuit configured as a linear programming problem solving system to find a solution to a linear programming problem of optimizing an objective function of a variable vector and a cost vector under constraints represented by simultaneous formulas having a given constraint coefficient matrix, the constraint vector varying at any time, and the variable vector including a variable having the variable dimensionality different from a constraint dimensionality of the constraint vector varying at any time, the optimal solution calculation circuit including an active set dual solution storage including a memory to store information about a dual problem of the linear programming problem being a primal problem and active sets representing combinations of active formulas in dual constraints being constraints in the dual problem, in a manner associated with a feasible dual solution candidate meeting the constraints for each of the active sets, a constraint vector receiver to receive the information about the constraint vector varying at any time, an optimal active set computator to select an optimal one of the active sets as an optimal active set based on an inner product of the constraint vector and the feasible dual solution candidate stored in the storage, and an optimal solution computator to find and output, as an optimal solution, a basic feasible solution corresponding to the active set selected by the optimal active set computator, wherein the constraint dimensionality is greater than the variable dimensionality, the simultaneous formulas are simultaneous inequalities, the dual constraints are equality constraints equal in number to the variable dimensionality and represented by a transposed matrix of the constraint coefficient matrix and are nonnegative constraints on a solution vector to the dual problem, the optimal active set computator finds an active set minimizing the determined inner product as the optimal active set, and the optimal solution is provided as a rotor thrust command to each of the rotors.

* * * * *